(12) United States Patent
Sharma et al.

(10) Patent No.: US 12,143,734 B1
(45) Date of Patent: *Nov. 12, 2024

(54) ENHANCED DEPTH OF FOCUS CAMERAS USING VARIABLE APERTURES AND PIXEL BINNING

(71) Applicant: Waymo LLC, Mountain View, CA (US)

(72) Inventors: Shashank Sharma, Mountain View, CA (US); Ralph H. Shepard, Menlo Park, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/169,532

(22) Filed: Feb. 15, 2023

Related U.S. Application Data

(63) Continuation of application No. 17/340,522, filed on Jun. 7, 2021, now Pat. No. 11,606,517.

(51) Int. Cl.
*H04N 5/347* (2011.01)
*G01S 17/89* (2020.01)
(Continued)

(52) U.S. Cl.
CPC ............. *H04N 25/46* (2023.01); *G01S 17/89* (2013.01); *G02B 27/0075* (2013.01); *H04N 25/75* (2023.01)

(58) Field of Classification Search
CPC ........ H04N 5/347; H04N 5/378; G01S 17/89; G02B 27/0075
See application file for complete search history.

(56) References Cited

U.S. PATENT DOCUMENTS

| | | |
|---|---|---|
| 7,711,259 B2 | 5/2010 | Daley |
| 8,587,681 B2 | 11/2013 | Guidash |

(Continued)

OTHER PUBLICATIONS

"Flexible Depth of Field Photography"; Sujit Kuthirummal, et al.; IEEE Transactions on Pattern Analysis and Machine Intelligence, vol. 33, Issue 1, pp. 58-71 (Mar. 18, 2010).

(Continued)

*Primary Examiner* — Nam D Pham
(74) *Attorney, Agent, or Firm* — McDonnell Boehnen Hulbert & Berghoff LLP

(57) ABSTRACT

Example embodiments relate to enhanced depth of focus cameras using variable apertures and pixel binning. An example embodiment includes a device. The device includes an image sensor. The image sensor includes an array of light-sensitive pixels and a readout circuit. The device also includes a variable aperture. Additionally, the device includes a controller that is configured to cause: the variable aperture to adjust to a first aperture size when a high-light condition is present, the variable aperture to adjust to a second aperture size when a low-light condition is present, the readout circuit to perform a first level of pixel binning when the high-light condition is present, and the readout circuit to perform a second level of pixel binning when the low-light condition is present. The second aperture size is larger than the first aperture size. The second level of pixel binning is greater than the first level of pixel binning.

20 Claims, 13 Drawing Sheets

(51) Int. Cl.
  *G02B 27/00* (2006.01)
  *H04N 5/378* (2011.01)
  *H04N 25/46* (2023.01)
  *H04N 25/75* (2023.01)

(56) References Cited

U.S. PATENT DOCUMENTS

| | | | |
|---|---|---|---|
| 9,134,114 | B2 | 9/2015 | Metz et al. |
| 9,294,754 | B2 | 3/2016 | Billerbeck et al. |
| 9,495,751 | B2 | 11/2016 | Wajs |
| 9,787,899 | B1 | 10/2017 | Hinkel et al. |
| 9,800,856 | B2 | 10/2017 | Venkataraman et al. |
| 10,708,476 | B2 | 7/2020 | Sesti et al. |
| 2010/0128137 | A1 | 5/2010 | Guidash |
| 2012/0154596 | A1 | 6/2012 | Wajs |
| 2016/0088239 | A1 | 3/2016 | Wajs |
| 2019/0208118 | A1* | 7/2019 | Jasinski ............ H04N 23/67 |
| 2020/0029023 | A1 | 1/2020 | Wippermann et al. |

OTHER PUBLICATIONS

"Detection Sensitivity"; Concept Tech Note 3; Caliper Life Sciences, Inc. (2011).

"Depth of Field Myth and Digital Cameras, Clarkvision.com"; Roger N. Clark; retrieved from https://clarkvision.com/articles/dof_myth; (First Published Aug. 18, 2006; Last Updated Mar. 18, 2017).

"Diffraction Limit | Edmund Optics"; Section 3.1 of the Imaging Resource Guide; retrieved from https://www.edmundoptics.com/knowledge-center/application-notes/imaging/diffraction-limit/ (retrieved on Mar. 9, 2021).

"Digital Cameras: Does Pixel Size Matter? Factors in Choosing a Digital Camera (Does Sensor Size Matter?), Clarkvision.com"; Roger N. Clark; retrieved from https://clarkvision.com/articles/does.pixel.size.matter/#Depth_of_Field_Myth (First Published Feb. 2005; Last Updated Jul. 12, 2016).

"Hamamatsu Learning Center: Pixel Binning"; Mortimer Abramowitz, et al.; retrieved from https://hamamatsu.magnet.fsu.edu/articles/binning.html (retrieved on Mar. 29, 2021).

"Flexible Depth of Field Photography"; Hajime Nagahara, et al.; ECCV 2008, Part IV, LNCS 5305, pp. 60-73 (2008).

"Resolution | Edmund Optics"; Section 2.2 of the Imaging Resource Guide; retrieved from https://www.edmundoptics.com/knowledge-center/application-notes/imaging/resolution/ (retrieved on Mar. 9, 2021).

"Electrically actuated liquid iris"; Miao Xu, et al.; Optics Letters, vol. 40, No. 5 (Mar. 1, 2015).

"Could This Be The Aperture Iris Of The Future?"; Kishore Sawh; retrieved from https://www.slrlounge.com/new-chemical-iris-aperture-meant-phones-change-interchangeable-lenses/ (published in 2014, retrieved on Apr. 12, 2021).

"OnePlus Concept One; color-shifting glass technology explained"; Habeeb Onawole; retrieved from https://www.gizmochina.com/2020/01/04/oneplus-concept-one-color-shifting-glass-technology-explained/ (published Jan. 4, 2020, retrieved on Apr. 12, 2021).

"OnePlus Concept One Uses Electrochromic Glass to Hide the Rear Camera Array When Not Needed"; Omar Sohail; retrieved from wccftech.com/oneplus-concept-one-electrochromatic-glass/ (published on Jan. 7, 2020, retrieved on Apr. 12, 2021).

* cited by examiner

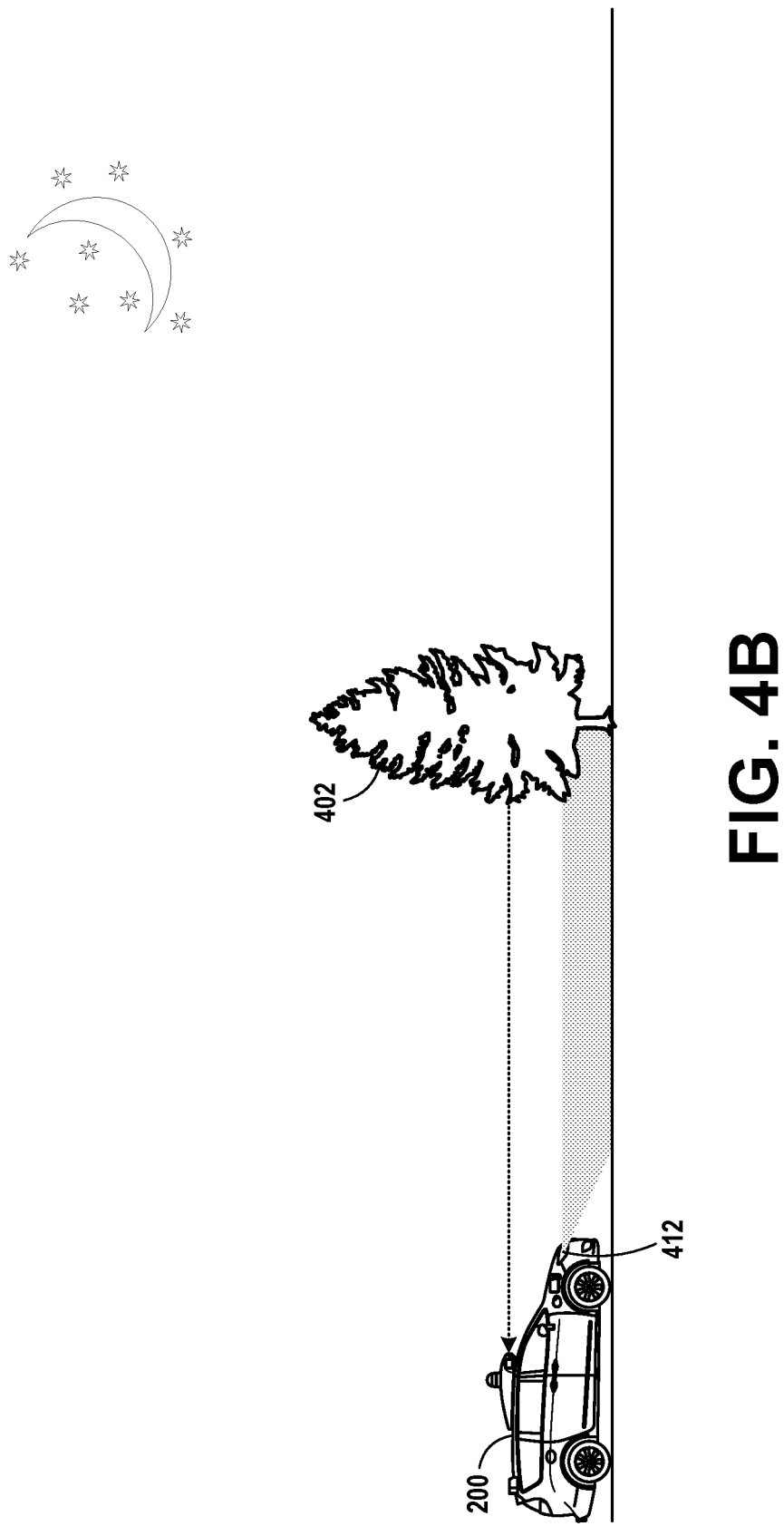

ENHANCED DEPTH OF FOCUS CAMERAS USING VARIABLE APERTURES AND PIXEL BINNING

CROSS-REFERENCE TO RELATED APPLICATIONS

The present application is a continuation of U.S. patent application Ser. No. 17/340,522, filed Jun. 7, 2021, the content of which is hereby incorporated by reference in its entirety.

BACKGROUND

Unless otherwise indicated herein, the materials described in this section are not prior art to the claims in this application and are not admitted to be prior art by inclusion in this section.

Cameras and image sensors are devices used to capture images of a scene. Some cameras (e.g., film cameras) chemically capture an image on film. Other cameras (e.g., digital cameras) electrically capture image data (e.g., using a charge-coupled device (CCD) or complementary metal-oxide-semiconductor (CMOS) sensors). Images captured by cameras can be analyzed to determine their contents. For example, a processor may execute a machine-learning algorithm in order to identify objects in a scene based on a library of previously classified objects that includes objects' shapes, colors, sizes, etc. (e.g., such a machine-learning algorithm can be applied in computer vision in robotics or other applications).

Cameras can have a variety of features that can distinguish one camera from another. For example, cameras and/or images captured by cameras may be identified by values such as aperture size, f-number, exposure time, shutter speed, depth of field, depth of focus, focal length, International Organization for Standardization (ISO) sensitivity (or gain), pixel size, sensor resolution, exposure distance, etc. These features may be based on the lens, the image sensor, and/or additional facets of the camera. Further, these features may also be adjustable within a single camera (e.g., the aperture of a lens on a camera can be adjusted between photographs).

SUMMARY

The disclosure relates to enhanced depth of focus cameras that use variable apertures and pixel binning. Traditionally (e.g., in machine-vision applications), fixed-focus cameras have combined a large static aperture to receive sufficient light across all lighting conditions with a static level of pixel binning (e.g., no pixel binning) to maintain a constant resolution across all lighting conditions. Correspondingly, such fixed-focus cameras have a fixed depth of focus across all lighting conditions. In order to account for all lighting conditions with a static aperture and a static level of pixel binning, the depth of focus may be relatively low. As described herein, by combining a variable aperture with an adjustable level of pixel binning, different settings for different lighting conditions (e.g., a high-light setting and a low-light setting) may be achieved. This may allow for an enhanced depth of focus (and, similarly, an enhanced depth of field) across all lighting conditions.

In one aspect, a device is provided. The device includes an image sensor configured to capture one or more images of a scene based on light received via a lens oriented along an optical axis. The image sensor includes an array of light-sensitive pixels and a readout circuit. The device also includes a variable aperture oriented along the optical axis. Additionally, the device includes a controller. The controller is configured to cause the variable aperture to adjust to a first aperture size when a high-light condition is present. The controller is also configured to cause the variable aperture to adjust to a second aperture size when a low-light condition is present. The second aperture size is larger than the first aperture size. Further, the controller is configured to cause the readout circuit to perform a first level of pixel binning when the high-light condition is present. In addition, the controller is configured to cause the readout circuit to perform a second level of pixel binning when the low-light condition is present. The second level of pixel binning is greater than the first level of pixel binning.

In another aspect, a method is provided. The method includes determining, by a controller, whether a high-light condition or a low-light condition is present. The method also includes causing, by the controller when the high-light condition is present: a variable aperture oriented along an optical axis to adjust to a first aperture size and a readout circuit of an image sensor to perform a first level of pixel binning. The image sensor includes an array of light-sensitive pixels and is configured to capture one or more images of a scene based on light received via a lens oriented along the optical axis. Additionally, the method includes causing, by the controller when the low-light condition is present: the variable aperture to adjust to a second aperture size and the readout circuit to perform a second level of pixel binning. The second aperture size is larger than the first aperture size. The second level of pixel binning is greater than the first level of pixel binning. Further, the method includes capturing, by the image sensor, an image of the scene.

In an additional aspect, a non-transitory, computer-readable medium having instructions stored therein is provided. The instructions, when executed by a processor, perform a method. The method includes determining whether a high-light condition or a low-light condition is present. The method also includes causing, when the high-light condition is present: a variable aperture oriented along an optical axis to adjust to a first aperture size and a readout circuit of an image sensor to perform a first level of pixel binning. The image sensor includes an array of light-sensitive pixels and is configured to capture one or more images of a scene based on light received via a lens oriented along the optical axis. Additionally, the method includes causing, when the low-light condition is present: the variable aperture to adjust to a second aperture size and the readout circuit to perform a second level of pixel binning. The second aperture size is larger than the first aperture size. The second level of pixel binning is greater than the first level of pixel binning. Further, the method includes causing the image sensor to capture an image of the scene.

These as well as other aspects, advantages, and alternatives will become apparent to those of ordinary skill in the art by reading the following detailed description, with reference, where appropriate, to the accompanying drawings.

BRIEF DESCRIPTION OF THE DRAWINGS

FIG. 4B is an illustration of a low-light condition, according to example embodiments.

DETAILED DESCRIPTION

Figure 1:
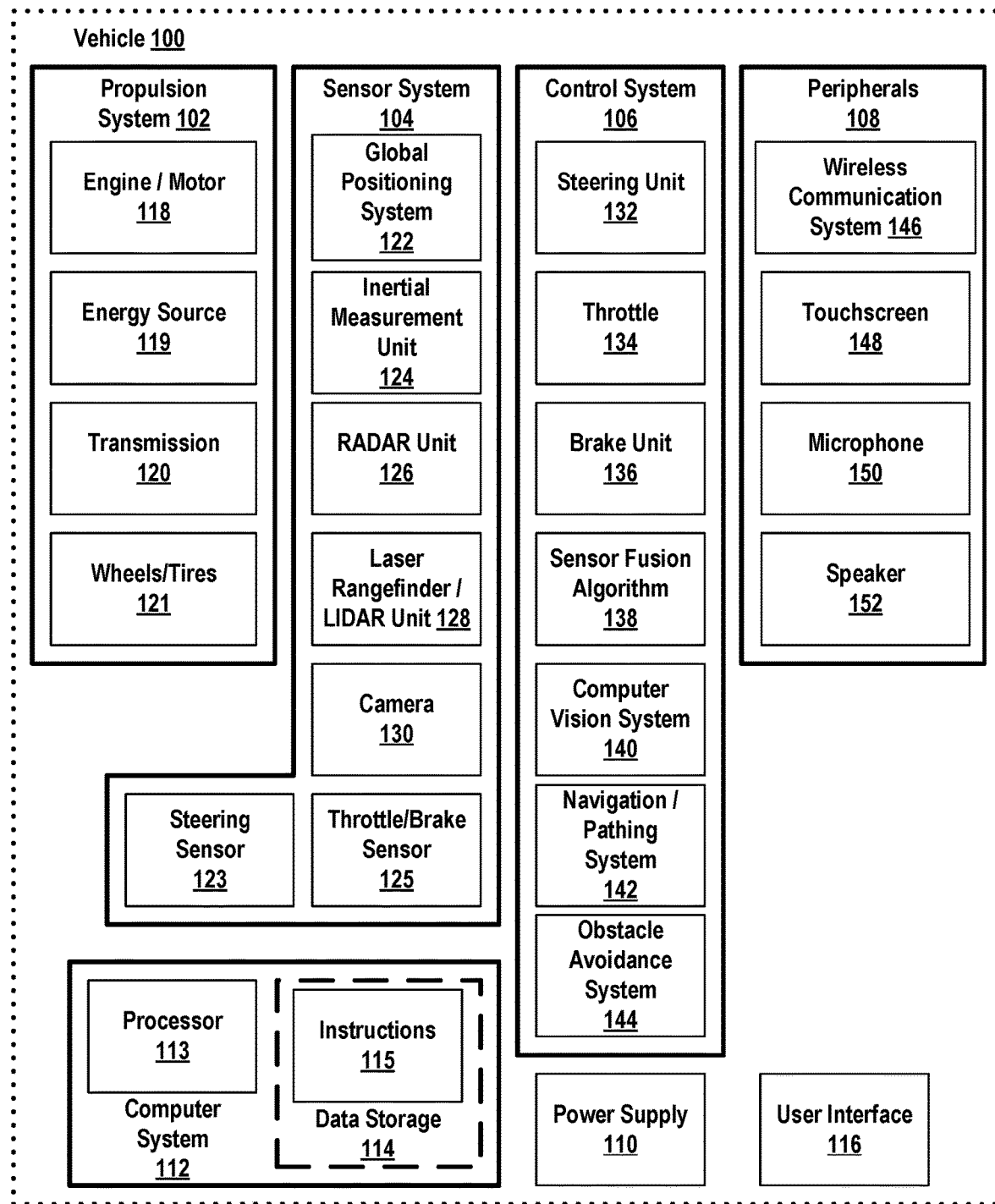
FIG. 1 is a functional block diagram illustrating a vehicle, according to example embodiments.
Figure 2A:
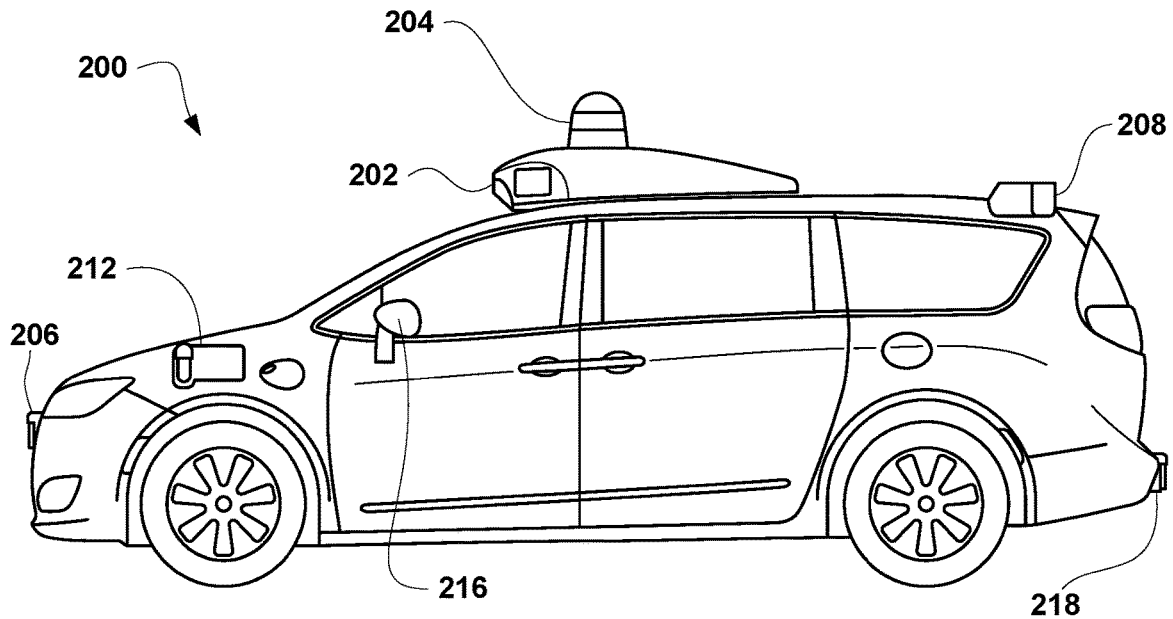
FIG. 2A is an illustration of a physical configuration of a vehicle, according to example embodiments.
Figure 2B:
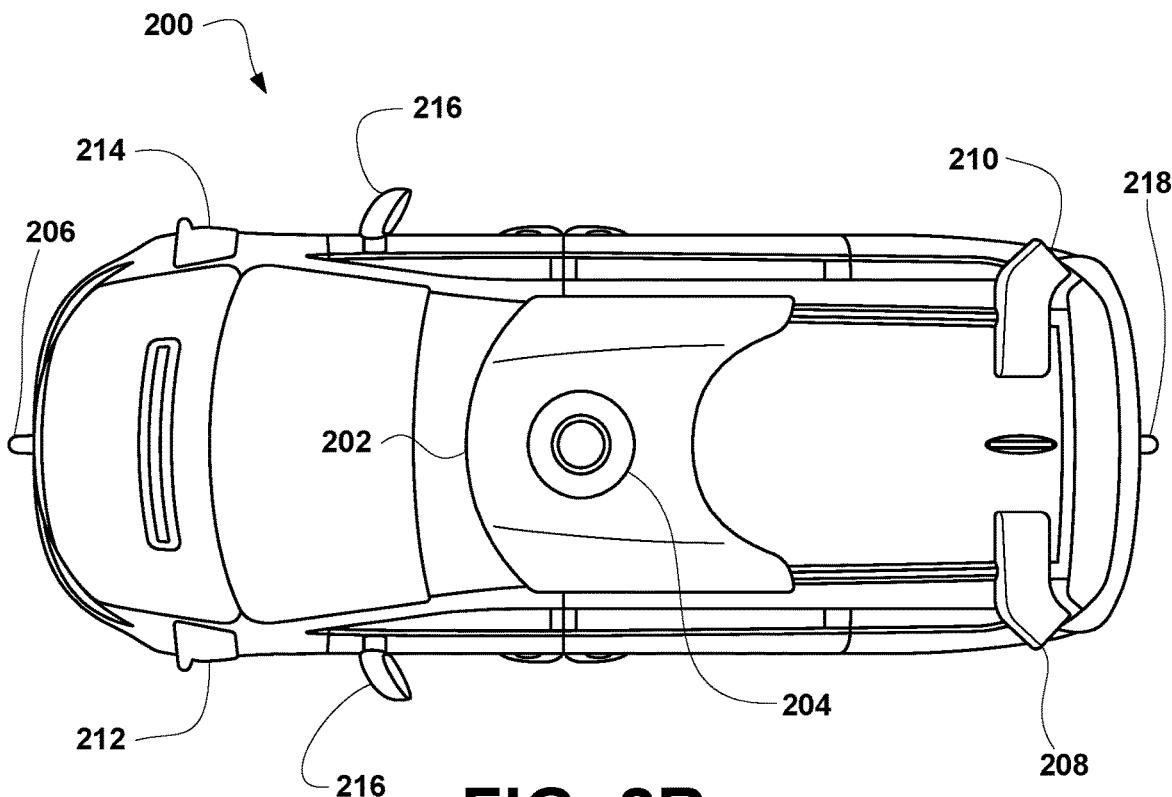
FIG. 2B is an illustration of a physical configuration of a vehicle, according to example embodiments.
Figure 2C:
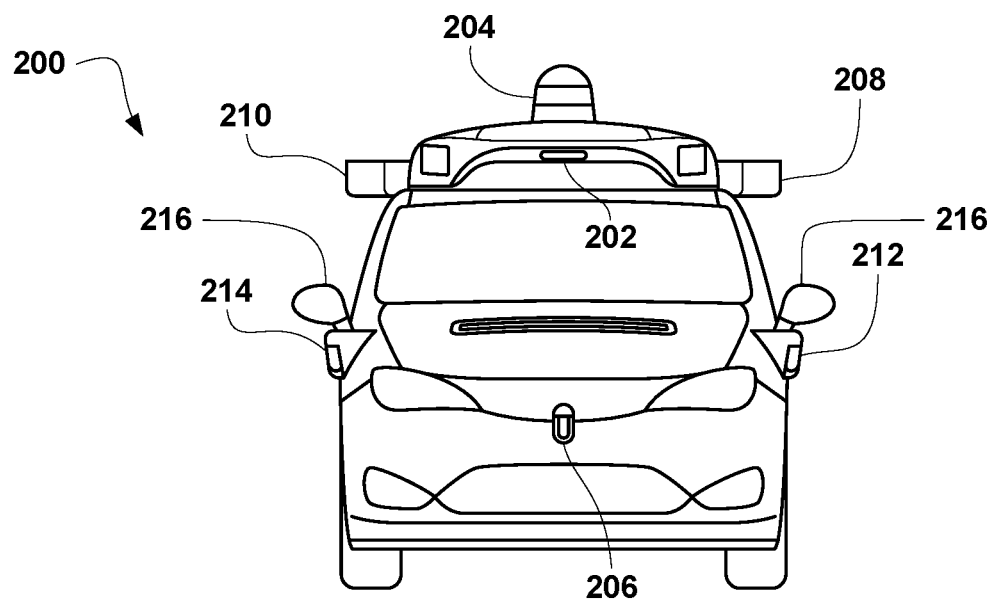
FIG. 2C is an illustration of a physical configuration of a vehicle, according to example embodiments.
Figure 2D:
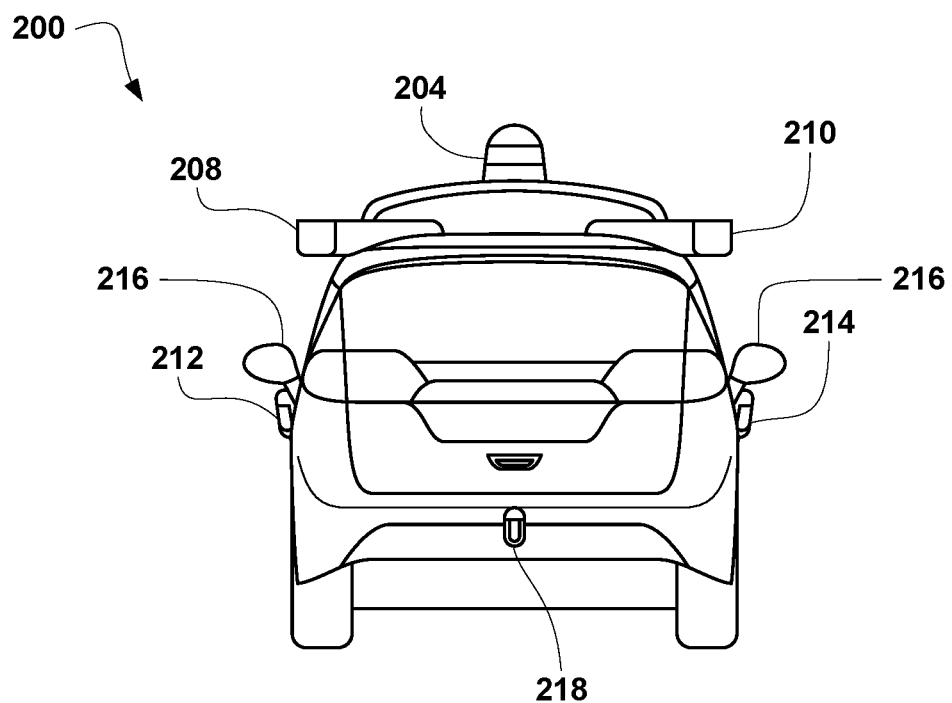
FIG. 2D is an illustration of a physical configuration of a vehicle, according to example embodiments.
Figure 2E:
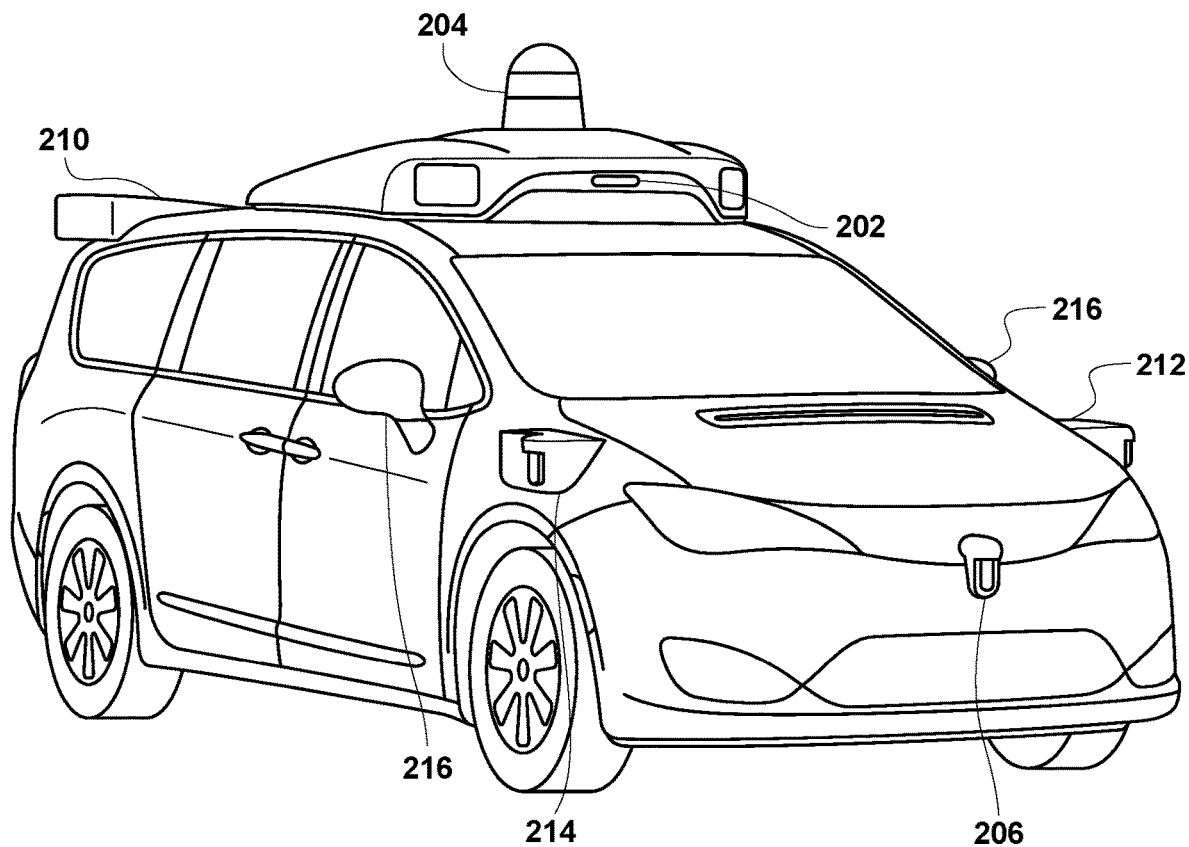
FIG. 2E is an illustration of a physical configuration of a vehicle, according to example embodiments.

Example methods and systems are contemplated herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the figures should not be viewed as limiting. It should be understood that other embodiments might include more or less of each element shown in a given figure. Further, some of the illustrated elements may be combined or omitted. Yet further, an example embodiment may include elements that are not illustrated in the figures.

The term "depth of focus" is used throughout this disclosure. As used herein, the term depth of focus corresponds to a lens-specific measurement of the tolerance of the location of an image plane relative to the position of the lens. The greater the depth of focus, the more tolerant the location of the image plane while maintaining acceptable focus on the subject being imaged. Said a different way, the greater the depth of focus, the greater the range of locations at which an image plane (e.g., an image sensor in a camera) can be positioned while still producing an image of a subject that is acceptably in focus. The depth of focus may depend on the aperture size of the aperture placed in front of the lens, the circle of confusion of the lens, the focal length of the lens, and the position of the image of the subject.

The term "depth of field" is also used throughout the disclosure. The depth of field is a closely related concept to the depth of focus, but involves the subject-side of the lens, rather than the image-side of the lens. The depth of field relates to the range of locations (from the closest to the farthest away) that a subject can be positioned relative to a lens such that, for a fixed image plane, the subject will remain acceptably in focus. Said a different way, the depth of field describes the in-focus tolerance of the subject position relative to the fixed position of the lens.

In addition, the term "circle of confusion" is used throughout the disclosure. The circle of confusion is the circular region caused by imperfections in a lens of an optical system. While a perfect/ideal lens would focus all incoming rays to a single spot (a focal point), physical lenses cannot be produced to such a level of perfection. Hence, the smallest region to which light can be focused by the lens may correspond to a circle. This circle may be referred to as the circle of confusion. Typically, circles of confusion are measured in terms of their diameter, though other measurements are also possible (e.g., radius, area, etc.). Further, because all rays of light incident on an actual lens (rather than a hypothetical perfect lens) may not be focused to the same focal point, there may be many circles of confusion. However, when used herein, unless context dictates otherwise, the term "circle of confusion" is used to represent the smallest circle of confusion, sometimes also referred to as the "circle of least confusion."

Still further, the term "aperture" is used throughout the disclosure. The "aperture" may represent an exposed region (e.g., circular in shape) in front of the lens of an optical system (e.g., in between the lens of a camera and surrounding environment) that allows light to pass through the lens. Any region in the plane of, but outside, the "aperture" may prevent light from entering the lens and, ultimately, from being imaged (e.g., by an image sensor of a camera). As described throughout, there are multiple types of apertures. An aperture may be measured in terms of radius, diameter, area, etc. and may be static in size/shape and/or variable in size/shape (e.g., in the case of a variable aperture). A common way of measuring aperture size is in terms of f-number (i.e., focal ratio or f-ratio). The f-number of the aperture may correspond to the focal length of the lens divided by the diameter of the aperture (assuming a circular aperture). In other words, N=f/D, where N represents the f-number of the lens, f represents the focal length of the lens, and D represents the diameter of the lens. In some cases, the f-number may be represented in the format "f/N," where f is the focal length of the lens and N is the f-number. For example, an aperture with f-number=2 may be represented by "f/2" and may correspond to an aperture having a diameter that is equal to half the focal length of the corresponding lens. As such, apertures having larger f-numbers are smaller in diameter and vice versa. Further, the aperture size can be used to alter an exposure (e.g., for a camera) by altering the amount of light allowed to pass through the lens and/or can be used to adjust a depth of focus associated with the camera (e.g., with a smaller aperture corresponding to a larger depth of focus).

Even further, the term "pixel binning" is used throughout this disclosure. Described herein are image sensors (e.g., CCDs) capable of detecting light from a surrounding environment using light-sensitive pixels (e.g., coupled to a readout circuit). The light-sensitive pixels may each be configured to generate an electrical signal (e.g., an amount of electrical charge) when irradiated with light from a portion of the surrounding environment. By collecting the electrical signal (e.g., electrical charge) from each of the light-sensitive pixels (e.g., sequentially), the readout circuit can produce an image signal that can be used (e.g., by a corresponding computing device) to reconstruct the image of the scene. "Pixel binning," as used herein, refers to a technique performed by the image sensor that involves grouping the electrical signals (e.g., electrical charges) generated by multiple light-sensitive pixels (e.g., multiple adjacent light-sensitive pixels) together into a single electrical signal (i.e., a single bin or a single bucket) to form "metapixels" or "effective pixels." The grouped electrical signals may then be transmitted as an effective image signal to a computing device for image reconstruction. Because the electrical signals from multiple light-sensitive pixels may be grouped together, the resolution of the image sensor may decrease, as multiple adjacent light-sensitive pixels may now only sense light from the surrounding environment as one effective pixel. However, by increasing the level of pixel binning (i.e., by grouping more light-sensitive pixels into a single effective pixel), the signal-to-noise ratio (SNR) of the image signal may also increase.

I. Overview

Depth of focus and the related concept, depth of field, describe how tolerant an image capture device (e.g., a camera) is when it comes to capturing images of objects in a surrounding scene at different depths that are still "in-focus." The depth of focus and, relatedly, the depth of field can be determined based on metrics of one or more components within the image capture device. For example, the focal length of a lens within the image capture device, the circle of confusion of the lens, and the size of the aperture within the image capture device (e.g., measured relative to the focal length of the lens, i.e., in f-number) may be used to determine the depth of focus of the image capture device. The greater the depth of focus, the greater the range of depths at which objects are identifiable within a captured image. Hence, for machine-vision applications (e.g., autonomous vehicles), enhanced depth of focus can enhance object detection and avoidance. This can reduce and/or eliminate failures to identify and misidentifications of objects in a surrounding scene.

In many machine-vision applications, though, the surrounding scene may be highly variable. For example, lighting conditions in the surrounding scene may substantially vary between high-light conditions (e.g., during the day) and low-light conditions (e.g., at night). Throughout this disclosure, the terms "high-light condition" and "low-light condition" may be used to describe ambient lighting conditions. However, the terms could also be used to describe different lighting conditions based on the brightness of objects in a scene (e.g., a high-light condition corresponds to a camera capturing an image of the sun, whereas a low-light condition corresponds to a camera capturing an image of an oncoming tunnel). In addition to changes in lighting conditions, factors like motion blur due to motion in the surrounding environment and changing temperature also can vary significantly between image captures. For example, the same machine-vision system may be used to capture images both at night and during the day, both during the summer and during the winter, and/or both in cold climates and in warm climates. Further, many machine-vision applications use cameras that have fixed-focus lenses with static apertures. Hence, due to the static nature of the optics of the camera as well as the variable surrounding scene, the optics of many machine-vision cameras may be chosen in order to accommodate the most extreme conditions. For example, a static aperture may be designed with an aperture size that is large enough to accommodate the lowest light condition that the machine-vision camera may be expected to encounter during operation, such that an image can be captured at the lowest light condition with sufficient exposure (e.g., given a predetermined exposure time). Relatedly, the resolution of the image sensor of a camera may be set based on a desired spatial resolution (e.g., which itself may be determined based on an angular resolution at a predicted range). However, due to differing lighting conditions, the range at which objects can be observed by the camera may vary. Hence, the desired resolution may be selected, like the aperture size, based on a desired spatial resolution at the maximum range which the machine-vision camera may be expected to encounter during operation.

While the typical configurations described above may optimize the camera for operation at certain extremes of the operating range (e.g., maximum light, maximum distance, maximum temperature, etc.), because the settings may be static, the configurations may sacrifice performance throughout other portions of the operating range. For example, a resolution designed for a relatively large target range (e.g., between 300 m and 500 m) in high-light conditions may be superfluous at low-light conditions and/or at short target ranges (e.g., between 50 m and 100 m). In some cases, designing to such extremes of the operating range could, in fact, inhibit the operation of the camera. For example, if the camera is designed with a large aperture (to accommodate low-light conditions) and no pixel binning (to accommodate high resolution at ranges visible in high-light conditions), the camera may experience relatively large amounts of noise (i.e., a low SNR) at certain lighting-conditions (e.g., high-light conditions). Relatedly, designing for such extremes of the operating range could also result in relatively low depth of focus (e.g., both in low-light conditions and high-light conditions).

Described herein are devices that can mitigate the above-listed potential shortcomings using variable settings of both aperture size and pixel binning. Such devices may be used in machine-vision applications (e.g., for object detection and avoidance in autonomous vehicles and/or semi-autonomous vehicles). In some embodiments, the device may include an image sensor (e.g., with light-sensitive pixels and a readout circuit), a variable aperture, a lens (e.g., a fixed-focus lens), and a controller. The controller may be configured to adjust a level of pixel binning performed by the readout circuit of the image sensor. For example, the controller may cause the readout circuit to bin two, three, or four light-sensitive pixels together and represent that combination of light-sensitive pixels together as a single effective pixel in a composite output image (e.g., with reduced pixel count and, thereby, with reduced resolution). Similarly, the controller may cause the variable aperture (e.g., a mechanical iris) to adjust to different aperture sizes (e.g., adjust from f/1.6 to f/4.0). Such changes may be caused by the controller by transmitting an electrical control signal to the variable aperture and/or the readout circuit of the image sensor.

Adjustments to aperture size and pixel binning level may be caused by the controller in response to changes in ambient lighting conditions (e.g., as determined by the controller: by analyzing light intensity in one or more images previously captured by the image sensor and/or other image sensors (such as on other vehicles in a fleet of autonomous vehicles or on city infrastructure), based on a time of day, based on a look-up table or other datastore providing sunrise/sunset hours at certain latitudes during a certain time of year, and/or based on a map of lighting conditions collected over time based on one or more of the above). For example, in low-light conditions (e.g., nighttime) the controller may cause the variable aperture to adjust to a large aperture size (i.e., low f-number) and cause the readout circuit to perform a relatively large level of pixel binning (e.g., bin sixteen light-sensitive pixels into a single effective pixel). Likewise, in high-light conditions (e.g., daytime) the controller may cause the variable aperture to adjust to a small aperture size (i.e., high f-number) and cause the readout circuit to perform a relatively small level of pixel binning (e.g., no pixel binning, i.e., where each light-sensitive pixel corresponds to a single effective pixel). The small level of pixel binning may provide greater spatial resolution at a given range than the high level of pixel binning. However, the small level of pixel binning may also correspond to a lower SNR.

In high-light conditions the range at which targets can still be captured in an image might be significantly greater than in low-light conditions (e.g., about 400 m in high-light, as compared to about 100 m in low-light). This may be due to ambient light being limited in the low-light condition and limitations of associated artificial light. For example, in the low-light condition, if the device is a component of an autonomous vehicle, the distance at which objects in the environment can be observed and captured in images by the device might be limited by the distance illuminated by a headlamp of the autonomous vehicle. Oppositely, such limitations on visibility may not be present in high-light conditions. Because of such limitations on visibility in captured images, any hypothetical additional resolution that would be present for objects at greater ranges (e.g., 400 m) might be unusable at the low-light condition. Thus, resolution for such distances may be sacrificed in order to improve depth of focus. For example, a greater level of pixel binning may improve SNR at low-light conditions but may also sacrifice object resolution (e.g., for objects at large distances, such as 400 m). However, because such objects will not be visible at the low-light condition at large distances (e.g., 400 m) regardless, such a sacrifice may be warranted. Further, spatial resolution requirements for visible objects (e.g., a rule that states that all visible objects must be resolvable within at least 1 cm) can still be satisfied even with increased pixel binning at the low-light condition as it is understood that objects will not be attempted to be resolved at greater ranges (e.g., 400 m).

Additionally, by using a different aperture size and level of pixel binning at the low-light condition and at the high-light condition, enhanced depths of focus (e.g., both at the low-light condition and at the high-light condition) may be achieved. Assuming low magnification levels for a lens, depth of focus (t) is approximately equal to two times the diameter of the circle of confusion (c) associated with a given lens multiplied by the lens f-number (N). In other words, t≈2Nc. The diameter of the circle of confusion (c) for a given image sensor is typically expressed in a number of effective pixels (i.e., the number of light-sensitive pixels while accounting for pixel binning). Similarly, the diameter of the circle of confusion (c) is directly proportional to the distance an object is displaced from the focal point of the corresponding lens. Hence, an object four times the focal length from the lens will have a diameter of the circle of confusion (c) on the image sensor that is twice the diameter of the circle of confusion (c) of an object two times the focal length from the lens.

To demonstrate that a device having variable aperture and variable pixel binning can have improved dynamic range, a comparison is demonstrated below between the device described above and a hypothetical device that accommodates extremes of the operating range with static settings (e.g., as may be present in traditional machine-vision camera systems). The hypothetical device is assumed to be designed with an aperture having a static aperture size of f/1.6 to accommodate low-light conditions and an image sensor that has light-sensitive pixels of size 2.5 µm×2.5 µm and a readout circuit that applies no pixel binning (i.e., the number of light-sensitive pixels in an effective pixel is 1) to accommodate high-light conditions. The maximum visible target range may occur at 400 m (e.g., during the daytime). For the device described herein, an example embodiment with settings for a high-light condition and settings for a low-light condition is assumed. The high-light condition settings may, for example, correspond to an aperture size of f/4 and no pixel binning and a maximum visible target range of 400 m. The low-light condition settings may, for example, correspond to an aperture size of f/1.6 and a pixel binning level of 4 (i.e., the number of light-sensitive pixels in an effective pixel is 16, or 4×4 light-sensitive pixels are arranged into an effective pixel) and a maximum target range of 100 m. Further, the focal length of the lens is assumed to be fixed and the same in both the hypothetical device and the device described herein (i.e., the same fixed-focus lens is used in both cases). It is understood that these numbers are provided solely as an illustrative example and that other embodiments are also possible and are contemplated herein.

In order to perform sample calculations, the position of the subject of the captured image will also be assumed to be the maximum target range in each case. The first determination is what the circle of confusion (usually measured in terms of c, which is the diameter of the circle) is for each of: (1) the hypothetical static device; (2) the high-light condition settings for the example device described herein; and (3) the low-light condition settings for the example device described herein. Because the focal length and the maximum target range is the same for both the hypothetical static device and the high-light condition settings for the example device, the circle of confusion is the same for these two entities. This circle of confusion can be described here by a normalization factor, $C_1$, and may be measured in terms of effective pixels (i.e., groups of light-sensitive pixels arranged based on the level of pixel binning). While the low-light condition settings for the example device correspond to a maximum target range that is ¼ of the maximum target range of the hypothetical static device/high-light condition settings, the pixel binning of the low-light condition settings (and, correspondingly, the size of the effective pixels) is also 4 times that of the hypothetical static device/high-light condition settings. Because of this (and the fact that the focal length of the lens is also the same for the low-light condition settings), the circle of confusion for the low-light condition settings would also equal $C_1$, when measured in terms of effective pixels.

As described above, the depth of focus (t) is approximately equal to two times the diameter of the circle of confusion (c) associated with a given lens multiplied by the lens f-number (N), assuming low magnification levels. To convert from the normalization factor ($C_1$) based on effective pixels to actual circle of confusion (c), a multiplication by effective pixel size (e.g., effective pixel width when measuring in one dimension) may be performed. Hence, to compute depth of focus (t), t≈2Nc=2N×$C_1$×Effective Pixel Size. Per the example measurements above, the depth of focus ($t_1$) for the hypothetical static device is $t_1 \approx 2 \times 1.6 \times C_1 \times 2.5$ µm=$8C_1$ µm. Similarly, per the example measurements above, the high-light depth of focus ($t_2$) for the high-light condition settings is $t_2 \approx 2 \times 4 \times C_1 \times 2.5$ µm=$20C_1$ µm. Additionally, per the example measurements above, the low-light depth of focus ($t_3$) for the low-light condition settings is $t_3 \approx 2 \times 1.6 \times C_1 \times 10$ µm=$32C_1$ µm. As demonstrated, the depth of focus is greater in both the low-light condition settings and the high-light condition settings than in the hypothetical static device. This corresponds to a greater depth of field for both the low-light condition settings and the high-light condition settings when compared to the hypothetical static device, as well. The results and example measurements above are reproduced in the table below:

|  | Hypothetical Static Device | High-Light Condition Settings in Example Device Described Herein | Low-Light Condition Settings in Example Device Described Herein |
| --- | --- | --- | --- |
| Maximum Visible Target Distance | 400 m | 400 m | 100 m |
| Aperture (f-number) | 1.6 | 4.0 | 1.6 |
| Pixel Size | 2.5 µm | 2.5 µm | 2.5 µm |
| Pixel Binning | 1 | 1 | 4 (i.e., 16 pixels = 1 effective pixel) |
| Effective Pixel Size (in one dimension) | 2.5 µm | 2.5 µm | 10 µm |
| Normalization Factor for Circle of Confusion | $C_1$ | $C_1$ | $C_1$ |
| Circle of Confusion | 2.5 µm × $C_1$ | 2.5 µm × $C_1$ | 10 µm × $C_1$ |
| Depth of Focus | $2 \times 1.6 \times C_1 \times 2.5$ µm = $8C_1$ µm | $2 \times 4.0 \times C_1 \times 2.5$ µm = $20C_1$ µm | $2 \times 1.6 \times C_1 \times 10$ µm = $32 C_1$ µm |

As described above and throughout the disclosure, example devices having variable aperture and variable pixel binning may achieve enhanced depth of focus across different ambient lighting conditions. This may enhance object detection and avoidance performed on images captured using such devices, as well as enhance the prediction of objections detected and/or enhance motion planning related to navigation and/or rider or bystander comfort. Ambient lighting conditions, as described herein, may be determined based on time of day, cloud coverage, moon phase (e.g., full moon vs. new moon), and/or level of artificial lighting (e.g., spacing of street lights, brightness of street lights, number of other vehicles on a roadway having headlamps/taillamps, etc.). Further, environmental factors other than ambient light conditions (e.g., temperature, fog, precipitation, or other weather conditions) may be accounted for by a controller that causes adjustments to aperture size and/or pixel binning. Additionally, by utilizing a variable aperture and variable pixel binning, manufacturing tolerances can be higher (e.g., as they may be readily accounted for) and lens shifts due to changes in environmental temperature/pressure can be at least partially counteracted.

II. Example Embodiments

The following description and accompanying drawings will elucidate features of various example embodiments. The embodiments provided are by way of example, and are not intended to be limiting. As such, the dimensions of the drawings are not necessarily to scale.

Example systems within the scope of the present disclosure will now be described in greater detail. An example system may be implemented in or may take the form of an automobile. However, an example system may also be implemented in or take the form of other vehicles, such as cars, trucks, motorcycles, buses, boats, airplanes, helicopters, lawn mowers, earth movers, boats, snowmobiles, aircraft, recreational vehicles, amusement park vehicles, farm equipment, construction equipment, trams, golf carts, trains, trolleys, and robot devices. Other vehicles are possible as well. Further, in some embodiments, example systems might not include a vehicle.

Referring now to the figures, FIG. 1 is a functional block diagram illustrating example vehicle 100, which may be configured to operate fully or partially in an autonomous mode. More specifically, vehicle 100 may operate in an autonomous mode without human interaction through receiving control instructions from a computing system. As part of operating in the autonomous mode, vehicle 100 may use sensors to detect and possibly identify objects of the surrounding environment to enable safe navigation. In some embodiments, vehicle 100 may also include subsystems that enable a driver to control operations of vehicle 100.

As shown in FIG. 1, vehicle 100 may include various subsystems, such as propulsion system 102, sensor system 104, control system 106, one or more peripherals 108, power supply 110, computer system 112 (could also be referred to as a computing system), data storage 114, and user interface 116. In other examples, vehicle 100 may include more or fewer subsystems, which can each include multiple elements. The subsystems and components of vehicle 100 may be interconnected in various ways. In addition, functions of vehicle 100 described herein can be divided into additional functional or physical components, or combined into fewer functional or physical components within embodiments. For instance, the control system 106 and the computer system 112 may be combined into a single system that operates the vehicle 100 in accordance with various operations.

Propulsion system 102 may include one or more components operable to provide powered motion for vehicle 100 and can include an engine/motor 118, an energy source 119, a transmission 120, and wheels/tires 121, among other possible components. For example, engine/motor 118 may be configured to convert energy source 119 into mechanical energy and can correspond to one or a combination of an internal combustion engine, an electric motor, steam engine, or Stirling engine, among other possible options. For instance, in some embodiments, propulsion system 102 may include multiple types of engines and/or motors, such as a gasoline engine and an electric motor.

Energy source 119 represents a source of energy that may, in full or in part, power one or more systems of vehicle 100 (e.g., engine/motor 118). For instance, energy source 119 can correspond to gasoline, diesel, other petroleum-based fuels, propane, other compressed gas-based fuels, ethanol, solar panels, batteries, and/or other sources of electrical power. In some embodiments, energy source 119 may include a combination of fuel tanks, batteries, capacitors, and/or flywheels.

Transmission 120 may transmit mechanical power from engine/motor 118 to wheels/tires 121 and/or other possible systems of vehicle 100. As such, transmission 120 may include a gearbox, a clutch, a differential, and a drive shaft, among other possible components. A drive shaft may include axles that connect to one or more wheels/tires 121.

Wheels/tires 121 of vehicle 100 may have various configurations within example embodiments. For instance, vehicle 100 may exist in a unicycle, bicycle/motorcycle, tricycle, or car/truck four-wheel format, among other possible configurations. As such, wheels/tires 121 may connect to vehicle 100 in various ways and can exist in different materials, such as metal and rubber.

Sensor system 104 can include various types of sensors, such as a global positioning system (GPS) sensor 122, inertial measurement unit (IMU) 124, radar 126, laser rangefinder/lidar 128, camera 130, steering sensor 123, and throttle/brake sensor 125, among other possible sensors. In some embodiments, sensor system 104 may also include sensors configured to monitor internal systems of the vehicle 100 (e.g., $O_2$ monitor, fuel gauge, engine oil temperature, brake wear).

GPS sensor 122 may include a transceiver operable to provide information regarding the position of vehicle 100 with respect to the Earth. IMU 124 may have a configuration that uses one or more accelerometers and/or gyroscopes and may sense position and orientation changes of vehicle 100 based on inertial acceleration. For example, IMU 124 may detect a pitch and yaw of the vehicle 100 while vehicle 100 is stationary or in motion.

Radar 126 may represent one or more systems configured to use radio signals to sense objects, including the speed and heading of the objects, within the local environment of vehicle 100. As such, radar 126 may include antennas configured to transmit and receive radio signals. In some embodiments, radar 126 may correspond to a mountable radar system configured to obtain measurements of the surrounding environment of vehicle 100.

Laser rangefinder/lidar 128 may include one or more laser sources, a laser scanner, and one or more detectors, among other system components, and may operate in a coherent mode (e.g., using heterodyne detection) or in an incoherent detection mode. In some embodiments, the one or more detectors of the laser rangefinder/lidar 128 may include one or more photodetectors. Such photodetectors may be avalanche photodiodes (APDs). In some examples, such photodetectors may be capable of detecting single photons (e.g., SPADs). Further, such photodetectors can be arranged (e.g., through an electrical connection in series) into an array (e.g., as in a SiPM). In some examples, the one or more photodetectors are Geiger-mode operated devices and the lidar includes subcomponents designed for such Geiger-mode operation.

Camera 130 may include one or more devices (e.g., still camera or video camera) configured to capture images of the environment of vehicle 100.

Steering sensor 123 may sense a steering angle of vehicle 100, which may involve measuring an angle of the steering wheel or measuring an electrical signal representative of the angle of the steering wheel. In some embodiments, steering sensor 123 may measure an angle of the wheels of the vehicle 100, such as detecting an angle of the wheels with respect to a forward axis of the vehicle 100. Steering sensor 123 may also be configured to measure a combination (or a subset) of the angle of the steering wheel, electrical signal representing the angle of the steering wheel, and the angle of the wheels of vehicle 100.

Throttle/brake sensor 125 may detect the position of either the throttle position or brake position of vehicle 100. For instance, throttle/brake sensor 125 may measure the angle of both the gas pedal (throttle) and brake pedal or may measure an electrical signal that could represent, for instance, an angle of a gas pedal (throttle) and/or an angle of a brake pedal. Throttle/brake sensor 125 may also measure an angle of a throttle body of vehicle 100, which may include part of the physical mechanism that provides modulation of energy source 119 to engine/motor 118 (e.g., a butterfly valve or carburetor). Additionally, throttle/brake sensor 125 may measure a pressure of one or more brake pads on a rotor of vehicle 100 or a combination (or a subset) of the angle of the gas pedal (throttle) and brake pedal, electrical signal representing the angle of the gas pedal (throttle) and brake pedal, the angle of the throttle body, and the pressure that at least one brake pad is applying to a rotor of vehicle 100. In other embodiments, throttle/brake sensor 125 may be configured to measure a pressure applied to a pedal of the vehicle, such as a throttle or brake pedal.

Control system 106 may include components configured to assist in navigating vehicle 100, such as steering unit 132, throttle 134, brake unit 136, sensor fusion algorithm 138, computer vision system 140, navigation/pathing system 142, and obstacle avoidance system 144. More specifically, steering unit 132 may be operable to adjust the heading of vehicle 100, and throttle 134 may control the operating speed of engine/motor 118 to control the acceleration of vehicle 100. Brake unit 136 may decelerate vehicle 100, which may involve using friction to decelerate wheels/tires 121. In some embodiments, brake unit 136 may convert kinetic energy of wheels/tires 121 to electric current for subsequent use by a system or systems of vehicle 100.

Sensor fusion algorithm 138 may include a Kalman filter, Bayesian network, or other algorithms that can process data from sensor system 104. In some embodiments, sensor fusion algorithm 138 may provide assessments based on incoming sensor data, such as evaluations of individual objects and/or features, evaluations of a particular situation, and/or evaluations of potential impacts within a given situation.

Computer vision system 140 may include hardware and software operable to process and analyze images in an effort to determine objects, environmental objects (e.g., traffic lights, roadway boundaries, etc.), and obstacles. As such, computer vision system 140 may use object recognition, Structure From Motion (SFM), video tracking, and other algorithms used in computer vision, for instance, to recognize objects, map an environment, track objects, estimate the speed of objects, etc.

Navigation/pathing system 142 may determine a driving path for vehicle 100, which may involve dynamically adjusting navigation during operation. As such, navigation/pathing system 142 may use data from sensor fusion algorithm 138, GPS sensor 122, and maps, among other sources to navigate vehicle 100. Obstacle avoidance system 144 may evaluate potential obstacles based on sensor data and cause systems of vehicle 100 to avoid or otherwise negotiate the potential obstacles.

As shown in FIG. 1, vehicle 100 may also include peripherals 108, such as wireless communication system 146, touchscreen 148, microphone 150, and/or speaker 152. Peripherals 108 may provide controls or other elements for a user to interact with user interface 116. For example, touchscreen 148 may provide information to users of vehicle 100. User interface 116 may also accept input from the user via touchscreen 148. Peripherals 108 may also enable vehicle 100 to communicate with devices, such as other vehicle devices.

Wireless communication system 146 may wirelessly communicate with one or more devices directly or via a communication network. For example, wireless communication system 146 could use 3G cellular communication, such as code-division multiple access (CDMA), evolution-data optimized (EVDO), global system for mobile communications (GSM)/general packet radio service (GPRS), or cellular communication, such as 4G worldwide interoperability for microwave access (WiMAX) or long-term evolution (LTE), or 5G. Alternatively, wireless communication system 146 may communicate with a wireless local area network (WLAN) using WIFI® or other possible connections. Wireless communication system 146 may also communicate directly with a device using an infrared link, Bluetooth, or ZigBee, for example. Other wireless protocols, such as various vehicular communication systems, are possible within the context of the disclosure. For example, wireless communication system 146 may include one or more dedicated short-range communications (DSRC) devices that could include public and/or private data communications between vehicles and/or roadside stations.

Vehicle 100 may include power supply 110 for powering components. Power supply 110 may include a rechargeable lithium-ion or lead-acid battery in some embodiments. For instance, power supply 110 may include one or more batteries configured to provide electrical power. Vehicle 100 may also use other types of power supplies. In an example embodiment, power supply 110 and energy source 119 may be integrated into a single energy source.

Vehicle 100 may also include computer system 112 to perform operations, such as operations described therein. As such, computer system 112 may include at least one processor 113 (which could include at least one microprocessor) operable to execute instructions 115 stored in a non-transitory, computer-readable medium, such as data storage 114. In some embodiments, computer system 112 may represent a plurality of computing devices that may serve to control individual components or subsystems of vehicle 100 in a distributed fashion.

In some embodiments, data storage 114 may contain instructions 115 (e.g., program logic) executable by processor 113 to execute various functions of vehicle 100, including those described above in connection with FIG. 1. Data storage 114 may contain additional instructions as well, including instructions to transmit data to, receive data from, interact with, and/or control one or more of propulsion system 102, sensor system 104, control system 106, and peripherals 108.

In addition to instructions 115, data storage 114 may store data such as roadway maps, path information, among other information. Such information may be used by vehicle 100 and computer system 112 during the operation of vehicle 100 in the autonomous, semi-autonomous, and/or manual modes.

Vehicle 100 may include user interface 116 for providing information to or receiving input from a user of vehicle 100. User interface 116 may control or enable control of content and/or the layout of interactive images that could be displayed on touchscreen 148. Further, user interface 116 could include one or more input/output devices within the set of peripherals 108, such as wireless communication system 146, touchscreen 148, microphone 150, and speaker 152.

Computer system 112 may control the function of vehicle 100 based on inputs received from various subsystems (e.g., propulsion system 102, sensor system 104, and control system 106), as well as from user interface 116. For example, computer system 112 may utilize input from sensor system 104 in order to estimate the output produced by propulsion system 102 and control system 106. Depending upon the embodiment, computer system 112 could be operable to monitor many aspects of vehicle 100 and its subsystems. In some embodiments, computer system 112 may disable some or all functions of the vehicle 100 based on signals received from sensor system 104.

The components of vehicle 100 could be configured to work in an interconnected fashion with other components within or outside their respective systems. For instance, in an example embodiment, camera 130 could capture a plurality of images that could represent information about a state of an environment of vehicle 100 operating in an autonomous mode. The state of the environment could include parameters of the road on which the vehicle is operating. For example, computer vision system 140 may be able to recognize the slope (grade) or other features based on the plurality of images of a roadway. Additionally, the combination of GPS sensor 122 and the features recognized by computer vision system 140 may be used with map data stored in data storage 114 to determine specific road parameters. Further, radar 126 may also provide information about the surroundings of the vehicle.

In other words, a combination of various sensors (which could be termed input-indication and output-indication sensors) and computer system 112 could interact to provide an indication of an input provided to control a vehicle or an indication of the surroundings of a vehicle.

In some embodiments, computer system 112 may make a determination about various objects based on data that is provided by systems other than the radio system. For example, vehicle 100 may have lasers or other optical sensors configured to sense objects in a field of view of the vehicle. Computer system 112 may use the outputs from the various sensors to determine information about objects in a field of view of the vehicle, and may determine distance and direction information to the various objects. Computer system 112 may also determine whether objects are desirable or undesirable based on the outputs from the various sensors.

Although FIG. 1 shows various components of vehicle 100 (i.e., wireless communication system 146, computer system 112, data storage 114, and user interface 116) as being integrated into the vehicle 100, one or more of these components could be mounted or associated separately from vehicle 100. For example, data storage 114 could, in part or in full, exist separate from vehicle 100. Thus, vehicle 100 could be provided in the form of device elements that may be located separately or together. The device elements that make up vehicle 100 could be communicatively coupled together in a wired and/or wireless fashion.

FIGS. 2A-2E shows an example vehicle 200 that can include some or all of the functions described in connection with vehicle 100 in reference to FIG. 1. Although vehicle 200 is illustrated in FIGS. 2A-2E as a van for illustrative purposes, the present disclosure is not so limited. For instance, the vehicle 200 can represent a truck, a car, a semi-trailer truck, a motorcycle, a golf cart, an off-road vehicle, a farm vehicle, etc.

The example vehicle 200 includes a sensor unit 202, a first lidar unit 204, a second lidar unit 206, a first radar unit 208, a second radar unit 210, a first lidar/radar unit 212, a second lidar/radar unit 214, and two additional locations 216, 218 at which a radar unit, lidar unit, laser rangefinder unit, and/or other type of sensor or sensor(s) could be located on the vehicle 200. Each of the first lidar/radar unit 212 and the second lidar/radar unit 214 can take the form of a lidar unit, a radar unit, or both.

Furthermore, the example vehicle 200 can include any of the components described in connection with vehicle 100 of FIG. 1. The first and second radar units 208, 210 and/or the first and second lidar units 204, 206 can actively scan the surrounding environment for the presence of potential obstacles and can be similar to the radar 126 and/or laser rangefinder/lidar 128 in the vehicle 100.

The sensor unit 202 is mounted atop the vehicle 200 and includes one or more sensors configured to detect information about an environment surrounding the vehicle 200, and output indications of the information. For example, sensor unit 202 can include any combination of cameras, radars, lidars, range finders, inertial sensors, humidity sensors, and acoustic sensors. The sensor unit 202 can include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be movable in a scanning fashion within a particular range of angles and/or azimuths and/or elevations. The sensor unit 202 could be mounted atop the roof of a car, although other mounting locations are possible.

Additionally, the sensors of sensor unit 202 could be distributed in different locations and need not be collocated in a single location. Some possible sensor types and mounting locations include the two additional locations 216, 218. Furthermore, each sensor of sensor unit 202 can be configured to be moved or scanned independently of other sensors of sensor unit 202.

In an example configuration, one or more radar scanners (e.g., first and second radar units 208, 210) can be located near the rear of the vehicle 200, to actively scan the environment near the back of the vehicle 200 for the presence of radio-reflective objects. Similarly, the first lidar/radar unit 212 and the second lidar/radar unit 214 may be mounted near the front of the vehicle 200 to actively scan the environment near the front of the vehicle 200. A radar scanner can be situated, for example, in a location suitable to illuminate a region including a forward-moving path of the vehicle 200 without occlusion by other features of the vehicle 200. For example, a radar scanner can be embedded in and/or mounted in or near the front bumper, front headlights, cowl, and/or hood, etc. Furthermore, one or more additional radar scanning devices can be located to actively scan the side and/or rear of the vehicle 200 for the presence of radio-reflective objects, such as by including such devices in or near the rear bumper, side panels, rocker panels, and/or undercarriage, etc.

Although not shown in FIGS. 2A-2E, the vehicle 200 can include a wireless communication system. The wireless communication system may include wireless transmitters and receivers that could be configured to communicate with devices external or internal to the vehicle 200. Specifically, the wireless communication system could include transceivers configured to communicate with other vehicles and/or computing devices, for instance, in a vehicular communication system or a roadway station. Examples of such vehicular communication systems include DSRC, radio frequency identification (RFID), and other proposed communication standards directed towards intelligent transport systems.

The vehicle 200 can include a camera, possibly at a location inside sensor unit 202. The camera can be a photosensitive instrument, such as a still camera, a video camera, etc., that is configured to capture a plurality of images of the environment of the vehicle 200. To this end, the camera can be configured to detect visible light, and can additionally or alternatively be configured to detect light from other portions of the spectrum, such as infrared or ultraviolet light. The camera can be a two-dimensional detector, and can optionally have a three-dimensional spatial range of sensitivity. In some embodiments, the camera can include, for example, a range detector configured to generate a two-dimensional image indicating distance from the camera to a number of points in the environment. To this end, the camera may use one or more range detecting techniques. For example, the camera can provide range information by using a structured light technique in which the vehicle 200 illuminates an object in the environment with a predetermined light pattern, such as a grid or checkerboard pattern and uses the camera to detect a reflection of the predetermined light pattern from environmental surroundings. Based on distortions in the reflected light pattern, the vehicle 200 can determine the distance to the points on the object. The predetermined light pattern may comprise infrared light, or radiation at other suitable wavelengths for such measurements. In some examples, the camera can be mounted inside a front windshield of the vehicle 200. Specifically, the camera can be situated to capture images from a forward-looking view with respect to the orientation of the vehicle 200. Other mounting locations and viewing angles of camera can also be used, either inside or outside the vehicle 200. Further, the camera can have associated optics operable to provide an adjustable field of view. Still further, the camera can be mounted to vehicle 200 with a movable mount to vary a pointing angle of the camera, such as via a pan/tilt mechanism.

The vehicle 200 may include one or more other components in addition to or instead of those shown. The additional components may include electrical or mechanical functionality.

A control system of the vehicle 200 may be configured to control the vehicle 200 in accordance with a control strategy from among multiple possible control strategies. The control system may be configured to receive information from sensors coupled to the vehicle 200 (on or off the vehicle 200), modify the control strategy (and an associated driving behavior) based on the information, and control the vehicle 200 in accordance with the modified control strategy. The control system further may be configured to monitor the information received from the sensors, and continuously evaluate driving conditions; and also may be configured to modify the control strategy and driving behavior based on changes in the driving conditions.

Figure 3:
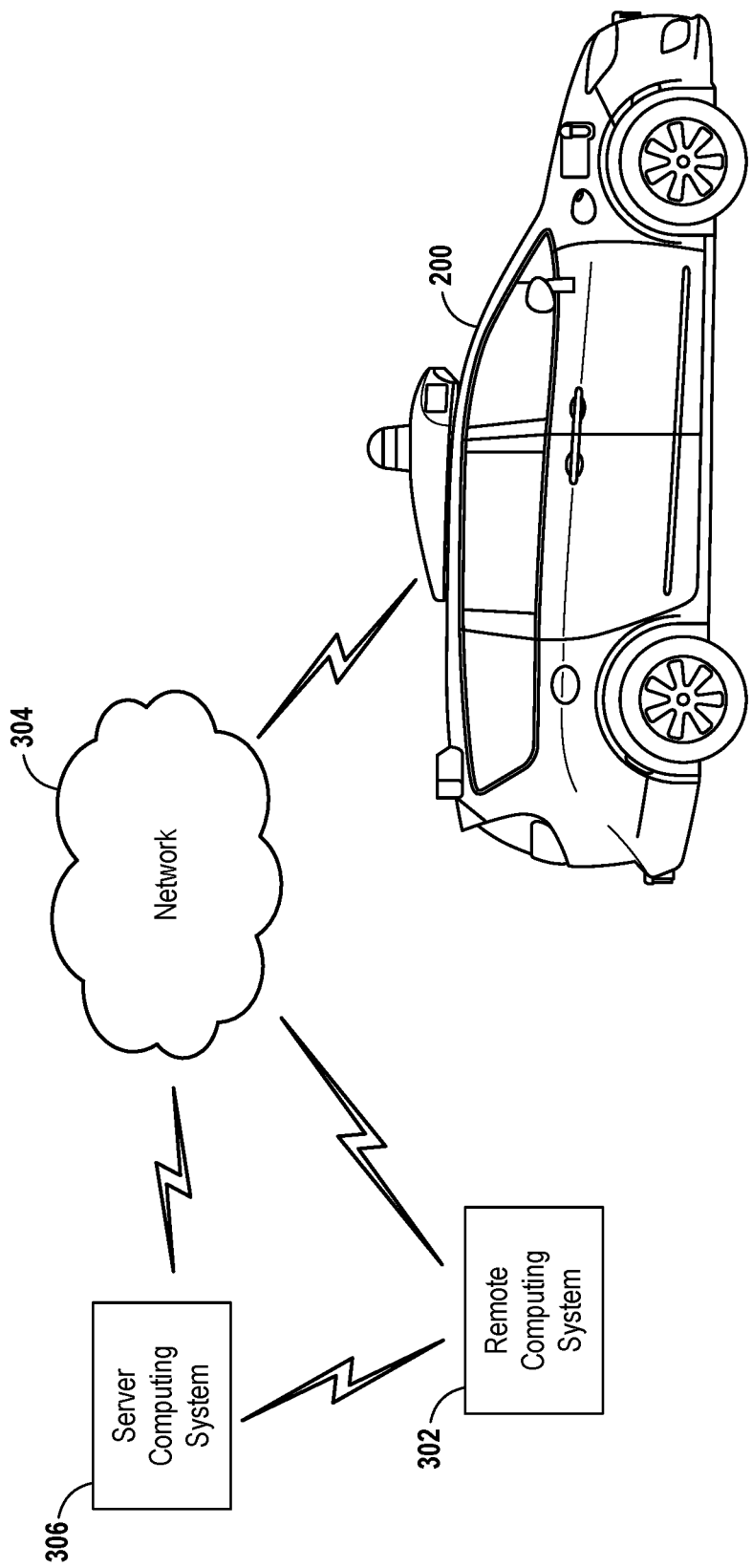
FIG. 3 is a conceptual illustration of wireless communication between various computing systems related to an autonomous vehicle, according to example embodiments.

FIG. 3 is a conceptual illustration of wireless communication between various computing systems related to an autonomous vehicle, according to example embodiments. In particular, wireless communication may occur between remote computing system 302 and vehicle 200 via network 304. Wireless communication may also occur between server computing system 306 and remote computing system 302, and between server computing system 306 and vehicle 200.

Vehicle 200 can correspond to various types of vehicles capable of transporting passengers or objects between locations, and may take the form of any one or more of the vehicles discussed above. In some instances, vehicle 200 may operate in an autonomous mode that enables a control system to safely navigate vehicle 200 between destinations using sensor measurements. When operating in an autonomous mode, vehicle 200 may navigate with or without passengers. As a result, vehicle 200 may pick up and drop off passengers between desired destinations.

Remote computing system 302 may represent any type of device related to remote assistance techniques, including but not limited to those described herein. Within examples, remote computing system 302 may represent any type of device configured to (i) receive information related to vehicle 200, (ii) provide an interface through which a human operator can in turn perceive the information and input a response related to the information, and (iii) transmit the response to vehicle 200 or to other devices. Remote computing system 302 may take various forms, such as a workstation, a desktop computer, a laptop, a tablet, a mobile phone (e.g., a smart phone), and/or a server. In some examples, remote computing system 302 may include multiple computing devices operating together in a network configuration.

Remote computing system 302 may include one or more subsystems and components similar or identical to the subsystems and components of vehicle 200. At a minimum, remote computing system 302 may include a processor configured for performing various operations described herein. In some embodiments, remote computing system 302 may also include a user interface that includes input/output devices, such as a touchscreen and a speaker. Other examples are possible as well.

Network 304 represents infrastructure that enables wireless communication between remote computing system 302 and vehicle 200. Network 304 also enables wireless communication between server computing system 306 and remote computing system 302, and between server computing system 306 and vehicle 200.

The position of remote computing system 302 can vary within examples. For instance, remote computing system 302 may have a remote position from vehicle 200 that has a wireless communication via network 304. In another example, remote computing system 302 may correspond to a computing device within vehicle 200 that is separate from vehicle 200, but with which a human operator can interact while a passenger or driver of vehicle 200. In some examples, remote computing system 302 may be a computing device with a touchscreen operable by the passenger of vehicle 200.

In some embodiments, operations described herein that are performed by remote computing system 302 may be additionally or alternatively performed by vehicle 200 (i.e., by any system(s) or subsystem(s) of vehicle 200). In other words, vehicle 200 may be configured to provide a remote assistance mechanism with which a driver or passenger of the vehicle can interact.

Server computing system 306 may be configured to wirelessly communicate with remote computing system 302 and vehicle 200 via network 304 (or perhaps directly with remote computing system 302 and/or vehicle 200). Server computing system 306 may represent any computing device configured to receive, store, determine, and/or send information relating to vehicle 200 and the remote assistance thereof. As such, server computing system 306 may be configured to perform any operation(s), or portions of such operation(s), that is/are described herein as performed by remote computing system 302 and/or vehicle 200. Some embodiments of wireless communication related to remote assistance may utilize server computing system 306, while others may not.

Server computing system 306 may include one or more subsystems and components similar or identical to the subsystems and components of remote computing system 302 and/or vehicle 200, such as a processor configured for performing various operations described herein, and a wireless communication interface for receiving information from, and providing information to, remote computing system 302 and vehicle 200.

The various systems described above may perform various operations. These operations and related features will now be described.

In line with the discussion above, a computing system (e.g., remote computing system 302, server computing system 306, or a computing system local to vehicle 200) may operate to use a camera to capture images of the environment of an autonomous vehicle. In general, at least one computing system will be able to analyze the images and possibly control the autonomous vehicle.

In some embodiments, to facilitate autonomous operation a vehicle (e.g., vehicle 200) may receive data representing objects in an environment in which the vehicle operates (also referred to herein as "environment data") in a variety of ways. A sensor system on the vehicle may provide the environment data representing objects of the environment. For example, the vehicle may have various sensors, including a camera, a radar unit, a laser range finder, a microphone, a radio unit, and other sensors. Each of these sensors may communicate environment data to a processor in the vehicle about information each respective sensor receives.

In one example, a camera may be configured to capture still images and/or video. In some embodiments, the vehicle may have more than one camera positioned in different orientations. Also, in some embodiments, the camera may be able to move to capture images and/or video in different directions. The camera may be configured to store captured images and video to a memory for later processing by a processing system of the vehicle. The captured images and/or video may be the environment data. Further, the camera may include an image sensor as described herein.

In another example, a radar unit may be configured to transmit an electromagnetic signal that will be reflected by various objects near the vehicle, and then capture electromagnetic signals that reflect off the objects. The captured reflected electromagnetic signals may enable the radar system (or processing system) to make various determinations about objects that reflected the electromagnetic signal. For example, the distances to and positions of various reflecting objects may be determined. In some embodiments, the vehicle may have more than one radar in different orientations. The radar system may be configured to store captured information to a memory for later processing by a processing system of the vehicle. The information captured by the radar system may be environment data.

In another example, a laser range finder may be configured to transmit an electromagnetic signal (e.g., infrared light, such as that from a gas or diode laser, or other possible light source) that will be reflected by target objects near the vehicle. The laser range finder may be able to capture the reflected electromagnetic (e.g., laser) signals. The captured reflected electromagnetic signals may enable the range-finding system (or processing system) to determine a range to various objects. The laser range finder may also be able to determine a velocity or speed of target objects and store it as environment data.

Additionally, in an example, a microphone may be configured to capture audio of the environment surrounding the vehicle. Sounds captured by the microphone may include emergency vehicle sirens and the sounds of other vehicles. For example, the microphone may capture the sound of the siren of an ambulance, fire engine, or police vehicle. A processing system may be able to identify that the captured audio signal is indicative of an emergency vehicle. In another example, the microphone may capture the sound of an exhaust of another vehicle, such as that from a motorcycle. A processing system may be able to identify that the captured audio signal is indicative of a motorcycle. The data captured by the microphone may form a portion of the environment data.

In yet another example, the radio unit may be configured to transmit an electromagnetic signal that may take the form of a Bluetooth signal, 802.11 signal, and/or other radio technology signal. The first electromagnetic radiation signal may be transmitted via one or more antennas located in a radio unit. Further, the first electromagnetic radiation signal may be transmitted with one of many different radio-signaling modes. However, in some embodiments it is desirable to transmit the first electromagnetic radiation signal with a signaling mode that requests a response from devices located near the autonomous vehicle. The processing system may be able to detect nearby devices based on the responses communicated back to the radio unit and use this communicated information as a portion of the environment data.

In some embodiments, the processing system may be able to combine information from the various sensors in order to make further determinations of the environment of the vehicle. For example, the processing system may combine data from both radar information and a captured image to determine if another vehicle or pedestrian is in front of the autonomous vehicle. In other embodiments, other combinations of sensor data may be used by the processing system to make determinations about the environment.

While operating in an autonomous mode, the vehicle may control its operation with little-to-no human input. For example, a human-operator may enter an address into the vehicle and the vehicle may then be able to drive, without further input from the human (e.g., the human does not have to steer or touch the brake/gas pedals), to the specified destination. Further, while the vehicle is operating autonomously, the sensor system may be receiving environment data. The processing system of the vehicle may alter the control of the vehicle based on environment data received from the various sensors. In some examples, the vehicle may alter a velocity of the vehicle in response to environment data from the various sensors. The vehicle may change velocity in order to avoid obstacles, obey traffic laws, etc. When a processing system in the vehicle identifies objects near the vehicle, the vehicle may be able to change velocity, or alter the movement in another way.

When the vehicle detects an object but is not highly confident in the detection of the object, the vehicle can request a human operator (or a more powerful computer) to perform one or more remote assistance tasks, such as (i) confirm whether the object is in fact present in the environment (e.g., if there is actually a stop sign or if there is actually no stop sign present), (ii) confirm whether the vehicle's identification of the object is correct, (iii) correct the identification if the identification was incorrect and/or (iv) provide a supplemental instruction (or modify a present instruction) for the autonomous vehicle. Remote assistance tasks may also include the human operator providing an instruction to control operation of the vehicle (e.g., instruct the vehicle to stop at a stop sign if the human operator determines that the object is a stop sign), although in some scenarios, the vehicle itself may control its own operation based on the human operator's feedback related to the identification of the object.

To facilitate this, the vehicle may analyze the environment data representing objects of the environment to determine at least one object having a detection confidence below a threshold. A processor in the vehicle may be configured to detect various objects of the environment based on environment data from various sensors. For example, in one embodiment, the processor may be configured to detect objects that may be important for the vehicle to recognize. Such objects may include pedestrians, street signs, other vehicles, indicator signals on other vehicles, and other various objects detected in the captured environment data.

The detection confidence may be indicative of a likelihood that the determined object is correctly identified in the environment, or is present in the environment. For example, the processor may perform object detection of objects within image data in the received environment data, and determine that the at least one object has the detection confidence below the threshold based on being unable to identify the object with a detection confidence above the threshold. If a result of an object detection or object recognition of the object is inconclusive, then the detection confidence may be low or below the set threshold.

The vehicle may detect objects of the environment in various ways depending on the source of the environment data. In some embodiments, the environment data may come from a camera and be image or video data. In other embodiments, the environment data may come from a lidar unit. The vehicle may analyze the captured image or video data to identify objects in the image or video data. The methods and apparatuses may be configured to monitor image and/or video data for the presence of objects of the environment. In other embodiments, the environment data may be radar, audio, or other data. The vehicle may be configured to identify objects of the environment based on the radar, audio, or other data.

In some embodiments, the techniques the vehicle uses to detect objects may be based on a set of known data. For example, data related to environmental objects may be stored to a memory located in the vehicle. The vehicle may compare received data to the stored data to determine objects. In other embodiments, the vehicle may be configured to determine objects based on the context of the data. For example, street signs related to construction may generally have an orange color. Accordingly, the vehicle may be configured to detect objects that are orange, and located near the side of roadways as construction-related street signs. Additionally, when the processing system of the vehicle detects objects in the captured data, it also may calculate a confidence for each object.

Further, the vehicle may also have a confidence threshold. The confidence threshold may vary depending on the type of object being detected. For example, the confidence threshold may be lower for an object that may require a quick responsive action from the vehicle, such as brake lights on another vehicle. However, in other embodiments, the confidence threshold may be the same for all detected objects. When the confidence associated with a detected object is greater than the confidence threshold, the vehicle may assume the object was correctly recognized and responsively adjust the control of the vehicle based on that assumption.

When the confidence associated with a detected object is less than the confidence threshold, the actions that the vehicle takes may vary. In some embodiments, the vehicle may react as if the detected object is present despite the low confidence level. In other embodiments, the vehicle may react as if the detected object is not present.

When the vehicle detects an object of the environment, it may also calculate a confidence associated with the specific detected object. The confidence may be calculated in various ways depending on the embodiment. In one example, when detecting objects of the environment, the vehicle may compare environment data to predetermined data relating to known objects. The closer the match between the environment data and the predetermined data, the higher the confidence. In other embodiments, the vehicle may use mathematical analysis of the environment data to determine the confidence associated with the objects.

In response to determining that an object has a detection confidence that is below the threshold, the vehicle may transmit, to the remote computing system, a request for remote assistance with the identification of the object. As discussed above, the remote computing system may take various forms. For example, the remote computing system may be a computing device within the vehicle that is separate from the vehicle, but with which a human operator can interact while a passenger or driver of the vehicle, such as a touchscreen interface for displaying remote assistance information. Additionally or alternatively, as another example, the remote computing system may be a remote computer terminal or other device that is located at a location that is not near the vehicle.

The request for remote assistance may include the environment data that includes the object, such as image data, audio data, etc. The vehicle may transmit the environment data to the remote computing system over a network (e.g., network 304), and in some embodiments, via a server (e.g., server computing system 306). The human operator of the remote computing system may in turn use the environment data as a basis for responding to the request.

In some embodiments, when the object is detected as having a confidence below the confidence threshold, the object may be given a preliminary identification, and the vehicle may be configured to adjust the operation of the vehicle in response to the preliminary identification. Such an adjustment of operation may take the form of stopping the vehicle, switching the vehicle to a human-controlled mode, changing a velocity of vehicle (e.g., a speed and/or direction), among other possible adjustments.

In other embodiments, even if the vehicle detects an object having a confidence that meets or exceeds the threshold, the vehicle may operate in accordance with the detected object (e.g., come to a stop if the object is identified with high confidence as a stop sign), but may be configured to request remote assistance at the same time as (or at a later time from) when the vehicle operates in accordance with the detected object.

Figure 4A:
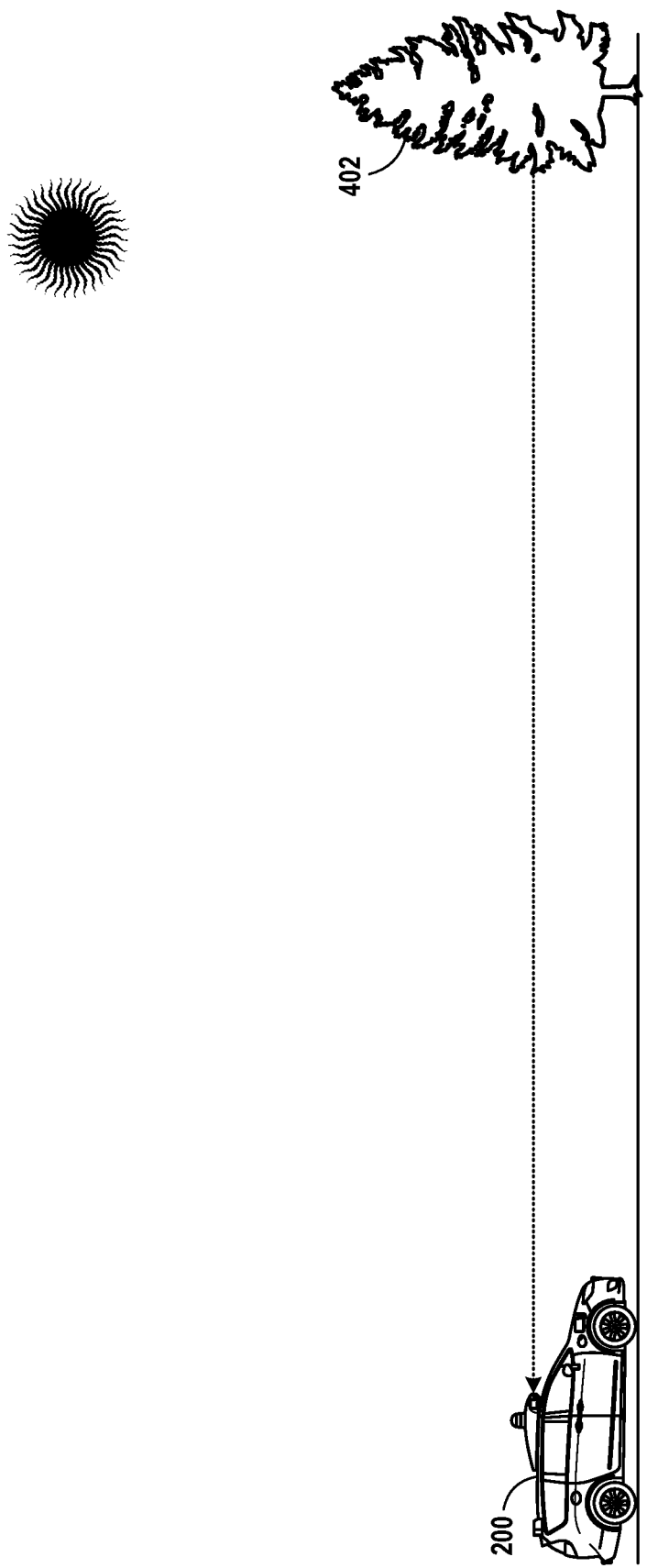
FIG. 4A is an illustration of a high-light condition, according to example embodiments.

FIG. 4A is a system that includes a vehicle (e.g., the vehicle 200 shown and described with reference to FIGS. 2A-2E) configured to detect and/or identify a target object 402. The target object 402 may be in the environment surrounding the vehicle 200. The vehicle 200 may detect the target object 402 and provide one or more maneuvers to avoid the target object 402. Detecting and avoiding the target object 402 may include using one or more lidar units, radar units, cameras, etc. For example, as described herein, a camera may capture an image of the target object 402. The image may be processed using one or more processors of the vehicle 200 and, based on the image analysis, the processor may identify the one or more target objects 402. Thereafter, based on the identification, a processor of the vehicle 200 may make one or more control decisions. While the target object 402 is depicted in FIG. 4A as a tree, it is understood that any number of types of target objects are contemplated herein. For example, roads, road signs, traffic signals, other vehicles, buildings, pedestrians, bicycles, curbs, etc. may all be types of target objects 402 contemplated herein.

The system illustrated in FIG. 4A may represent a high-light condition. For example, as illustrated, the vehicle 200 may be attempting to detect the target object 402 during the daytime. During the daytime, the ambient lighting conditions may be relatively high given the presence of sunlight. Other types of high-light conditions are possible and contemplated herein, as well. For example, locations with significant amounts of artificial light may also correspond to high-light conditions. Due to the high-light condition, certain detection devices of the vehicle 200 (e.g., detection devices making use of visible light, such as cameras) may be capable of detecting the target object 402 at relatively high ranges (e.g., about 300 m, about 400 m, about 500 m, about 600 m, etc.). Further, as described below, the level of pixel binning and/or the aperture size used within the detection device (e.g., camera) of the vehicle 200 to capture an image of the surrounding scene (e.g., and the target object 402) for the high-light condition may be based on the maximum detectable range (e.g., a desired linear resolution at the maximum detectable range) at the high-light condition (e.g., at the range of the target object 402 illustrated in FIG. 4A, such as about 400 m).

FIG. 4B in an illustration of the same system illustrated in FIG. 4A. However, unlike FIG. 4A, FIG. 4B may represent a low-light condition. For example, as illustrated, the vehicle 200 may be attempting to detect the target object 402 at nighttime. During the nighttime, the ambient lighting conditions may be relatively low given the lack of sunlight. Other types of low-light conditions are possible and contemplated herein, as well. For example, concealed locations with low amounts of artificial light may also correspond to low-light conditions (e.g., tunnels, garages, warehouses, etc.). Detection devices of the vehicle 200 that make use of visible light can have their detection hampered due to the low-light conditions (e.g., due to low visibility). As such, the vehicle 200 may include an equipped headlamp 412. The headlamp 412 may include a fluorescent light bulb, a light-emitting diode (LED), or another artificial illumination device. Further, in some embodiments, the headlamp 412 may include one or more mirrors and/or lenses (e.g., a fresnel lens). Using the headlamp 412, artificial light may be projected into the environment surrounding the vehicle 200. Based on the artificial light, detection devices of the vehicle 200 that make use of visible light (e.g., cameras) may be capable of detecting objects at longer ranges than otherwise possible. In some embodiments, the detection range of the detection devices of the vehicle 200 may be limited to the range of the artificial light projected by the headlamp 412. For example, as illustrated in FIG. 4B, the headlamp 412 may illuminate a region in front of the vehicle 200. In some embodiments, though, the visible range provided by the headlamp 412 may remain moderate relative to the visible range in high-light conditions (e.g., as illustrated in FIG. 4A). For example, as illustrated in FIG. 4B, the range of detectable target objects 402 may be reduced when compared with FIG. 4A (e.g., about 50 m, about 100 m, or about 150 m, as compared to about 300 m, about 400 m, about 500 m, about 600 m, etc.). Further, as described below, the level of pixel binning and/or the aperture size used within the detection device (e.g., camera) of the vehicle 200 to capture an image of the surrounding scene (e.g., and the target object 402) for the low-light condition may be based on the maximum detectable range (e.g., a desired linear resolution at the maximum detectable range) at the low-light condition using illumination from the headlamp 412 (e.g., at the range of the target object 402 illustrated in FIG. 4B, such as about 100 m). In other words, the level of pixel binning and/or the aperture size used within the detection device (e.g., camera) of the vehicle 200 to capture an image of the scene (e.g., and the target object 402) for the low-light condition may be based on a radiant intensity of the headlamp 412.

As described throughout this disclosure, because the detection device on the vehicle 200 might not be able to capture images of target objects at relatively long range in low-light conditions, the angular resolution (e.g., corresponding to the light-sensitive pixel resolution of an image sensor of the detection device) may be reduced for low-light conditions without sacrificing linear resolution at the target object 402. This may allow for pixel binning in low-light conditions while still maintaining sufficient target resolution given that it is known that the target will not be detectable beyond a certain range. Said a different way, and as an example, if it is desired to be able to resolve any target object that is at least 1.0 cm in height or width within an image captured by the detection device, this can be accomplished using a lower angular resolution (and lower light-sensitive pixel resolution at the image sensor) for target objects that are closer than for target objects that are farther away. As such, pixel binning can be implemented for closer target objects (e.g., as are present in low-light conditions) without sacrificing the ability to resolve target objects that are at least 1.0 cm in height or width when it is known that a target object will be at a closer range (e.g., about 100 m instead of about 400 m).

It is understood that the headlamp 412 illustrated in FIG. 4B is provided solely as an example and that other forms of artificial illumination could be used for low-light condition detection and are contemplated herein. For example, a plurality headlamps, one or more taillamps, artificial illumination devices that provide light around the periphery of the vehicle 200, artificial illumination devices that provide light above or below the vehicle 200, artificial illumination devices unrelated to vehicles (e.g., a flashbulb from a camera), etc. could all be used with the detection devices described herein.

Figure 5A:
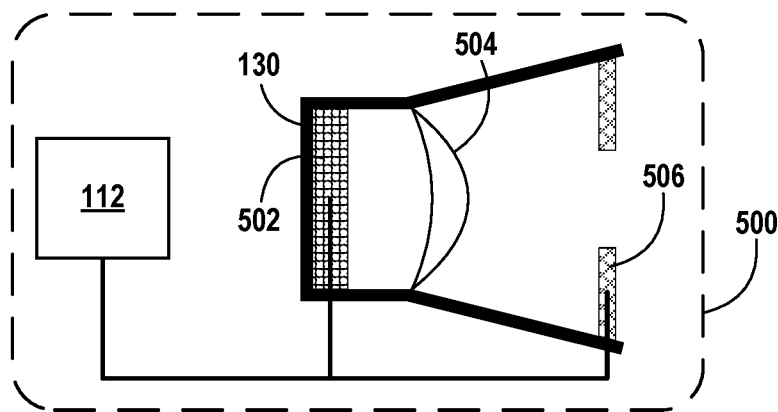
FIG. 5A is an illustration of a device, according to example embodiments.

FIG. 5A is an illustration of a detection device 500 (e.g., from a cutaway side view). In some embodiments, the detection device 500 may be used for machine vision. For example, the detection device 500 may be a component of the vehicle 200 illustrated in FIGS. 4A and 4B. In such embodiments, the detection device 500 may be used by the vehicle 200 to capture images used for object detection and avoidance (e.g., when the vehicle 200 is operating in an autonomous or semi-autonomous mode). While the detection device 500 may be used for machine vision, as described herein, it is understood that other uses (e.g., non-machine vision uses) are also possible and contemplated herein. For example, the detection device 500 could be used to enhance depth of focus for photography (e.g., within a digital single-lens reflex (DSLR) camera or an integrated camera on a mobile phone). As illustrated, the detection device 500 may include a camera (e.g., the camera 130 shown and described with reference to FIG. 1) and a controller (e.g., the computer system 112 shown and described with reference to FIG. 1). As illustrated in FIG. 5A, the camera 130 may include an image sensor 502 (e.g., positioned perpendicular or approximately perpendicular to an optical axis), a lens 504 (e.g., positioned such that the optical axis passes through the lens 504), and a variable aperture 506 (e.g., positioned such that the optical axis passes through the variable aperture 506).

As also illustrated, the image sensor 502 and the variable aperture 506 may be communicatively coupled to the controller 112 (e.g., via one or more wires or electrical traces). Using the communicative coupling, the controller 112 can cause the image sensor 502 and/or the variable aperture 506 to perform specified functions (e.g., using one or more control signals). For example, the controller 112 may cause the variable aperture to change size (e.g., to adjust to a larger aperture size or a smaller aperture size). Similarly, the controller 112 may cause the image sensor 502 to perform a specified level of pixel binning (e.g., no pixel binning, binning two pixels together, binning three pixels together, binning four pixels together, etc.). In some embodiments, the controller 112 may cause the variable aperture 506 and/or the image sensor 502 to perform specified functions based on one or more environmental conditions. For example, the controller 112 may cause the variable aperture 506 to adjust aperture size and/or the image sensor to perform a given level of pixel binning based on ambient lighting conditions (e.g., based on time of day or location), temperature, humidity, pressure, identified target object(s) in the surrounding environment, etc.

In some embodiments, the controller 112 may determine whether one or more environmental conditions are present by receiving an image captured by the image sensor 502 that is indicative of one or more environmental conditions and then analyzing the received image. For example, the controller 112 may receive, from the image sensor 502, one or more images that are indicative of an ambient light intensity incident on the image sensor. Then, based on the one or more received images, the controller 112 may determine the ambient light intensity of a surrounding environment (e.g., by analyzing the brightness of the pixels within at least one of the one or more received images). Thereafter, by comparing the determined ambient light intensity to an ambient intensity threshold (e.g., stored within a memory associated with the controller 112), the controller 112 may identify whether a high-light condition or a low-light condition is present. Alternatively, the controller 112 may determine the ambient lighting conditions based on a map (e.g., stored within a memory) that has expected lighting conditions for a given time of year and/or time of day and the location of the vehicle 200 on the map. Additional adjustments may be made to the ambient lighting condition determined based on the map based on additional factors (e.g., temperature, expected motion blur, etc.). Such additional factors may be determined by the controller 112 using one or more additional sensors of the vehicle 200 or based on one or more received communications (e.g., received from another vehicle in a fleet of vehicles or from a fleet management system).

In some embodiments, it is understood that, rather than simply a high-light condition or a low-light condition, there may be three or more lighting conditions (or three or more levels for other environmental conditions, such as humidity). For example, there may be an intermediate-lighting condition (e.g., present at dawn or dusk). In embodiments with more than two possible identifiable lighting conditions, there may be multiple thresholds against which the present lighting conditions are compared. Still further, in some embodiments, there may be a continuum of lighting conditions (rather than a discrete number of lighting conditions). In such embodiments, the controller 112 may simply analyze a raw brightness value of the pixels in one or more of the received images (e.g., rather than comparing the brightness value to a threshold to determine lighting conditions). Then, based on the raw brightness value, the controller 112 may cause the image sensor 502 to perform a specified level of pixel binning and/or the variable aperture 506 to be set to a given aperture size.

The lens 504 may be configured to focus light received from the surrounding environment via the variable aperture 506 onto the image sensor 502. In some embodiments, the lens 504 may have a fixed (i.e., non-adjustable) focal length.

In such embodiments, the lens 504 may be referred to as a "fixed-focus lens." In other embodiments, though, the lens 504 may be adjustable (e.g., to adjust a focal length of the lens). In such embodiments, the controller 112 may also be communicatively coupled to an actuator associated with the lens, where the actuator is configured to deform, move, rotate, or otherwise adjust the lens and/or one or more additional optics of the camera associated with the lens.

The variable aperture 506 may be an aperture through which light from the surrounding scene enters the camera 130. By adjusting the variable aperture 506, the amount of light captured by the image sensor 502 (e.g., which, along with the exposure time, dictates the amount of exposure) and/or the maximum cone angle of light captured by the image sensor 502 can be adjusted. In some embodiments, as illustrated in FIG. 5A, the variable aperture may include a mechanical aperture (e.g., an iris). Such a mechanical aperture may be adjusted by an actuator (e.g., an electric motor, such as a servo) in response to one or more control signals transmitted by the controller 112.

Figure 5B:
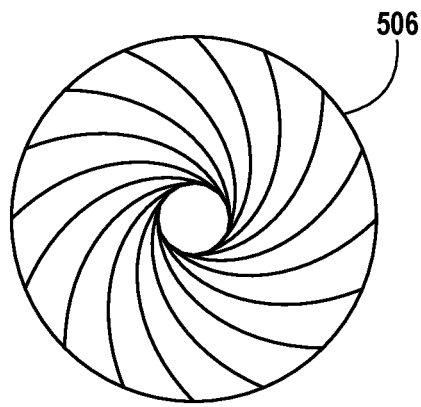
FIG. 5B is an illustration of a variable aperture having a first aperture size, according to example embodiments.
Figure 5C:
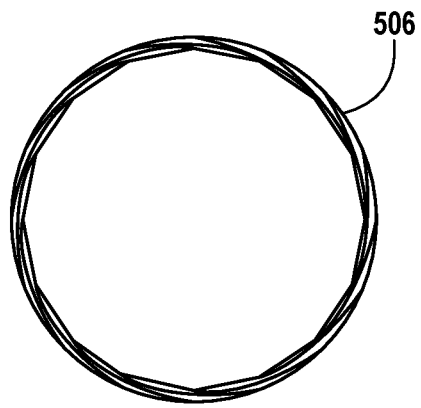
FIG. 5C is an illustration of a variable aperture having a second aperture size, according to example embodiments.

FIGS. 5B and 5C illustrate example embodiments where the variable aperture 506 includes an iris (e.g., from a front view). In FIG. 5B, the variable aperture 506 has been adjusted to a smaller aperture size (i.e., a larger f-number, such as an f-number between f/3.6 and f/4.4). The smaller aperture size may be used for high-light conditions (e.g., the ambient lighting conditions illustrated and described with reference to FIG. 4A). Likewise, in FIG. 5C, the variable aperture 506 has been adjusted to a larger aperture size (i.e., a smaller f-number, such as an f-number between f/1.4 and f/1.8). The larger aperture size may be used for low-light conditions (e.g., the ambient lighting conditions illustrated and described with reference to FIG. 4B). As described above, if all other factors are kept the same, a smaller aperture size (i.e., a larger f-number) corresponds to a larger depth of focus. While an iris is illustrated in FIGS. 5B and 5C, it is understood that other types of physical variable apertures could also be used. For example, one or more electro-active polymer-based physical variable apertures could be used. Further, while only two aperture sizes are shown in FIGS. 5A and 5B, it is understood that the variable aperture 506 may be adjustable to multiple other aperture sizes, as well. For example, the iris may be continuously variable from fully open to fully closed. In other embodiments, the variable aperture 506 may include two or more mechanical apertures, rather than a single mechanical aperture. For example, the variable aperture 506 may include multiple cascaded apertures (e.g., multiple cascaded irises). Additionally or alternatively, the variable aperture 506 may include multiple interchangeable/swappable apertures (e.g., that can be interchanged in order to change the aggregate aperture size).

While the variable aperture 506 is illustrated in FIGS. 5A-5C as a mechanical aperture (e.g., iris), it is understood that other types of variable apertures are also possible and are contemplated herein. For example, the variable aperture may include one or more electro-chromic materials (e.g., an electro-chromic neutral-density filter, an array of electro-chromic neutral-density filters, an electro-chromic aperture, an array of electro-chromic apertures, etc.) and/or one or more electrically actuated liquid lenses (e.g., irises).

Figure 6A:
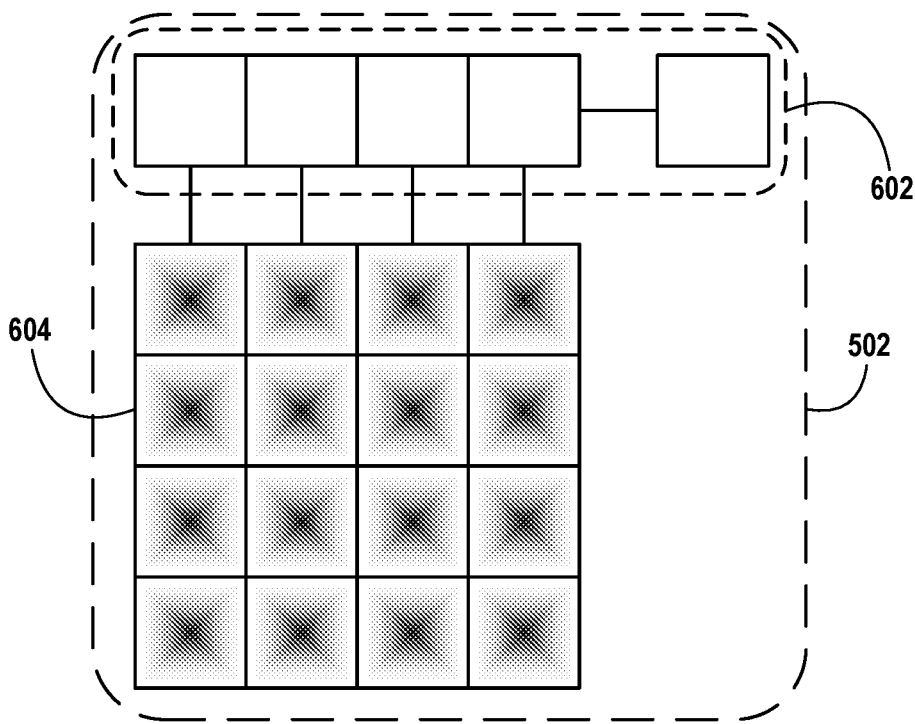
FIG. 6A is an illustration of an image sensor having a first level of pixel binning, according to example embodiments.
Figure 6B:
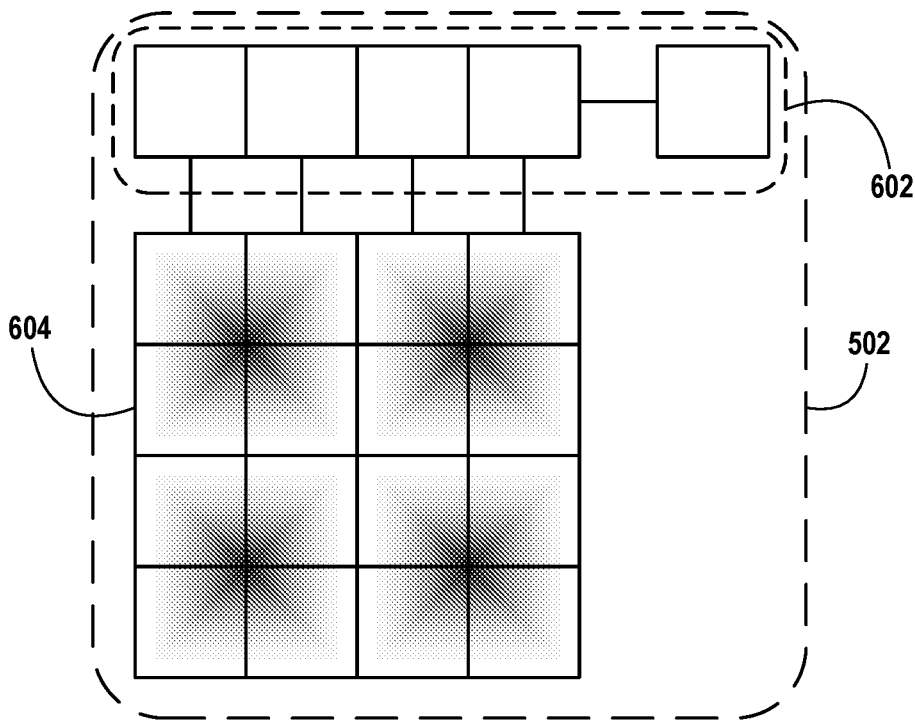
FIG. 6B is an illustration of an image sensor having a second level of pixel binning, according to example embodiments.

As described above, the camera 130 may include an image sensor 502. FIGS. 6A and 6B illustrate the image sensor 502 of the camera at different pixel binning levels. As illustrated in FIGS. 6A and 6B, the image sensor 502 may include a readout circuit 602 and an array 604 of light-sensitive pixels. In some embodiments, the readout circuit 602 and/or the array 604 of light-sensitive pixels may be coupled to the controller 112 (e.g., so as to be controllable by the controller 112 using control signals).

The light-sensitive pixels in the array 604 may be configured to convert an optical signal received at the light-sensitive pixel into an electrical signal. For example, the light-sensitive pixels in the array 604 may include p-doped metal-oxide semiconductor (MOS) capacitors, photodiodes, avalanche photodiodes, single-photon avalanche photodiodes, or other light-sensitive devices (e.g., other light-sensitive semiconductor structures). When receiving an optical signal (e.g., from an environment surrounding the detection device 500), each light-sensitive pixel in the array 604 may convert the optical signal into electrical charge. This electrical charge can then be transferred (e.g., sequentially along a row, column, or other subset of the array 604) to the readout circuit 602 in order to capture an electrical signal (e.g., based on the electrical charge) that corresponds to the optical signal (e.g., which depends on the intensity of the optical signal). In some embodiments, for example, the image sensor 502 may correspond to a CCD. By capturing the electrical signals for the light-sensitive pixels within the array 604 using the readout circuit 602, an image of the surrounding environment (based on the light signals transmitted and/or reflected by objects in the surrounding environment to the image sensor 502) can be reconstructed/captured (e.g., by the controller 112).

In some embodiments, the light-sensitive pixels in the array 604 may correspond to different wavelength ranges. For example, there may be red light-sensitive pixels, blue light-sensitive pixels, and green light-sensitive pixels (e.g., disposed adjacent to one another within the array 604) used to detect, correspondingly, red light, blue light, and green light. In this way, the image sensor 502 may be configured to capture color images based on the relative intensities of the three colors of light. Light-sensitive pixels may be sensitive to different wavelength ranges based on one or more optical filters (e.g., chromatic filters) positioned over the respective light-sensitive pixels. In the same way, different light-sensitive pixels in the array 604 may correspond to different polarizations (e.g., horizontal polarizations vs. vertical polarizations). Likewise, this could also be done using one or more optical filters (e.g., polarization filters) positioned over the respective light-sensitive pixels.

The readout circuit 602 may be configured to convert the electrical charges corresponding to the light signals detected by the light-sensitive pixels into an image signal. The image signal may then be transmitted to a computing device (e.g., the controller 112) for processing. Such a computing device may be onboard the camera 130 and/or separate from the camera 130. In some embodiments, the readout circuit 602 may include a serial shift register. Further, in some embodiments (e.g., the example embodiment illustrated in FIGS. 6A and 6B), the shift register may receive charge from each light-sensitive pixel in a given row of the array 604. This set of charges may then be transmitted to the corresponding computing device as a partial image signal, where the partial image signal represents a row within the captured image corresponding to the scene. After the set of charges corresponding to the first row are transmitted, a set of charges corresponding to the second row within the array 604 may be transmitted. In this way, an entire image's worth of charges generated by the light-sensitive pixels in the array 604 based on light received from the surrounding scene may be sequentially transmitted to the corresponding computing device. These rows may be used (e.g., by the corresponding computing device) to then reconstruct the captured image.

Though not illustrated in FIGS. 6A and 6B, it is understood that the readout circuit 602 could equally correspond to columns of light-sensitive pixels within the array 604 (as opposed to rows). Other arrangements are also possible and contemplated herein (e.g., the array 604 is arranged into a series of squares of light-sensitive pixels, with the readout circuit 602 sequentially reading out charges from the top-left corner light-sensitive pixel in each square down to the bottom-right corner light-sensitive pixel in each square).

The readout circuit 602 may be configured to perform pixel binning (e.g., based on one or more control signals received from a corresponding computing device, such as the controller 112). Pixel binning may include the readout circuit 602 grouping multiple light-sensitive pixels' worth of charge based on detected light signals together into a single entity (i.e., a single bin or a single bucket). Then, these groups of charge may be transmitted to a computing device (e.g., the controller 112) for reconstruction (i.e., rendering) into a final image. For example, two adjacent rows of collected light-sensitive pixel charge can be grouped together into a single row's worth or a single column's worth of collected charge and then transmitted to the computing device (e.g., controller 112). The light-sensitive pixels that are grouped together may sometimes alternatively be referred to as "effective pixels," "effective light-sensitive pixels," or "metapixels." Increasing the level of pixel binning may enhance the SNR of the image signal generated by the image sensor 502 that corresponds to the image. As described above, though, increased pixel binning may also reduce the inherent resolution of the image sensor 502. However, if the target range also changes along with the increased pixel binning, this can compensate for the reduction in resolution of the image sensor, resulting in a similar level of linear resolution at the target.

FIG. 6A illustrates a first level of pixel binning applied by the readout circuit 602 to the array 604 of light sensitive pixels. As illustrated, the first level of pixel binning may correspond to no pixel binning (e.g., every light-sensitive pixel in the array 604 corresponds to a single effective pixel read-out by the readout circuit 602). As described herein, the first level of pixel binning may be used in high-light conditions (e.g., during daytime) and/or where the target object can be observed/detected from relatively large distances (e.g., about 400 m). The first level of pixel binning may seek to optimize the resolution at the far target object range given the inherent resolution of the arrangement of light-sensitive pixels within the array 604, as well as maintain a relatively high depth of focus. While not depicted in FIG. 6A, it is understood that in some embodiments, the first level of pixel binning may correspond to at least some pixel binning (e.g., two light-sensitive pixels, three light-sensitive pixels, four light-sensitive pixels, etc. binned together).

FIG. 6B illustrates a second level of pixel binning applied by the readout circuit 602 to the array 604 of light-sensitive pixels. As illustrated, the second level of pixel binning may correspond to four pixels being binned together. For example, as depicted in FIG. 6B, the signals from two adjacent light-sensitive pixels (e.g., from adjacent columns) in a first row may be grouped together by the readout circuit 602 along with the signals from two adjacent light-sensitive pixels (e.g., from adjacent columns) in a second row adjacent to the first row in order to form the signal for an effective pixel. An effective pixel read-out by the readout circuit 602 may therefore be equal in size to four light-sensitive pixels (e.g., the second level of pixel binning corresponds to a four-fold reduction in a number of effective light-sensitive pixels within the array 604 when compared to the first level of pixel binning). For example, the effective pixel may be 25 $\mu m^2$ in surface area, as opposed to a single light-sensitive pixel that is 6.25 $\mu m^2$ in surface area. As described herein, the second level of pixel binning may be used in low-light conditions (e.g., during nighttime) and/or where the target object can be observed/detected from only relatively small distances (e.g., about 100 m). The second level of pixel binning may seek to optimize SNR at the near target object range, as well as maintain a relatively high depth of focus. It is understood that in various embodiments the second level of pixel binning may include a greater or smaller number of light-sensitive pixels binned or a different arrangement of light-sensitive pixels binned to form an effective pixel. For example, two light-sensitive pixels (e.g., from adjacent rows or adjacent columns), three light-sensitive pixels, four light-sensitive pixels (e.g., from a single row or from a single column), nine light-sensitive pixels (e.g., in a three-by-three arrangement), or sixteen light-sensitive pixels (e.g., in a four-by-four arrangement) are also possible. This may correspond to two-fold, three-fold, four-fold, nine-fold, or sixteen-fold reductions in the number of effective light-sensitive pixels in the array of light-sensitive pixels when compared to the first level of pixel binning (e.g., no pixel binning). Other numbers and arrangements of light-sensitive pixels used for the second level of pixel binning are also possible and are contemplated herein.

In some embodiments, the first level of pixel binning (e.g., as illustrated in FIG. 6A) and the first aperture size (e.g., as illustrated in FIG. 5B) may be determined (e.g., by the controller 112) based on a desired resolution at a first range (e.g., a maximum observable range under high-light ambient lighting conditions). For example, the desired resolution may indicate that at the first range (e.g., 400 m), a target object having at least one dimension of at least 1.0 cm (or some other size) should be detectable using the detection device 500. Based on this (e.g., as well as one or more values of components of the detection device 500, such as a focal length of the lens 504 or an inherent resolution of the array 604 of light-sensitive pixels), the controller 112 may determine the first pixel size and/or the first level of pixel binning. Similarly, the second level of pixel binning (e.g., as illustrated in FIG. 6B) and the second aperture size (e.g., as illustrated in FIG. 5C) may be determined (e.g., by the controller 112) based on a desired resolution at a second range (e.g., a maximum observable range under low-light ambient lighting conditions, where the maximum observable range is based on a radiant intensity of a vehicular headlamp).

While FIGS. 6A and 6B illustrate a first level and a second level of pixel binning, respectively, it is understood that other levels of pixel binning besides a first level and a second level (e.g., a third level of pixel binning used for intermediate-light conditions) are also possible and are contemplated herein.

In some embodiments, in addition to or instead of adjusting the level of pixel binning, the readout circuit 602 (or some other component of the image sensor 502) may also be configured to adjust a level of gain used when converting the optical signal into an image signal transmitted by the readout circuit 602 to a corresponding computing device. The level of gain may correspond to a setting on one or more amplifiers associated with the image sensor 502. Further, adjusting the level of gain may correspond to adjusting the amplitude of an image signal based on the intensity of the light signal received at a given light-sensitive pixel. For example, a greater gain level may mean a higher current for a given light signal intensity received. In some embodiments, a computing device (e.g., the controller 112) may cause the readout circuit 602 to perform a first level of gain in high-light conditions (e.g., during daytime) and a second level of gain in low-light conditions (e.g., during nighttime). The first level of gain may correspond to a relatively low level of gain whereas the second level of gain may correspond to a relatively high level of gain. Such a gain scheme may allow for increased sensitivity to dim objects in low-light conditions. However, such a scheme could also decrease SNR in low-light conditions, in some cases. Other gain levels (e.g., intermediate gain levels) are also possible and are contemplated herein.

As described above, in some embodiments, a detection device 500/associated camera 130 may operate in two modes: a high-light condition mode with high-light condition settings and a low-light condition mode with low-light settings. Such operational settings may include adjustments to the aperture size of a variable aperture 506, the level of pixel binning performed by a readout circuit 602, the amount of gain used, etc. Such a high-light/low-light scheme may be binary (i.e., the detection device 500 either operates in the high-light condition mode or the low-light condition mode). However, it is understood that other schemes are also possible and contemplated herein. For example, the detection device 500 may operate with three operational modes (e.g., a high-light condition mode at daytime, a low-light condition mode at nighttime, and an intermediate-light condition mode at dawn/dusk), four operational modes, five operational modes, six operational modes, etc. Still further, the detection device 500 may operate with a continuum of modes, rather than a discrete number of operating modes.

Figure 7A:
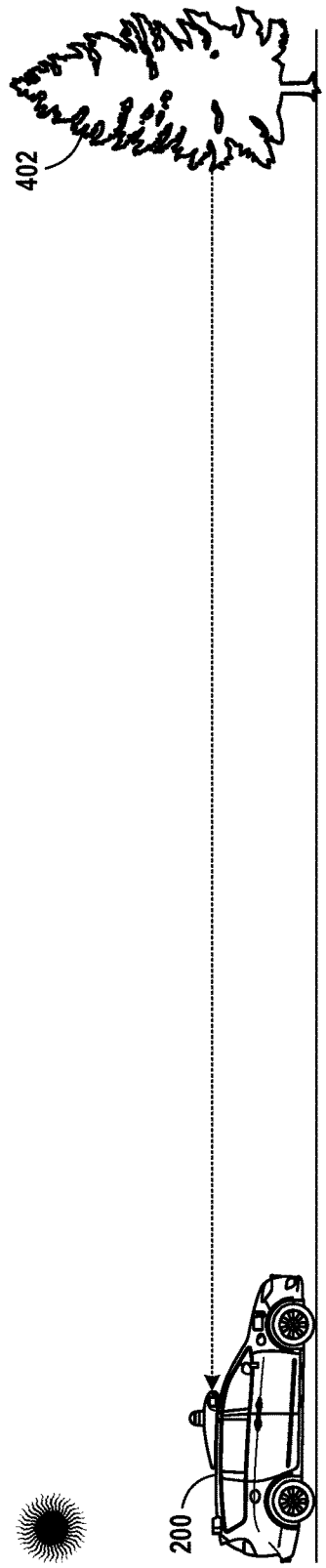
FIG. 7A is an illustration of a high-light condition, according to example embodiments.
Figure 7B:
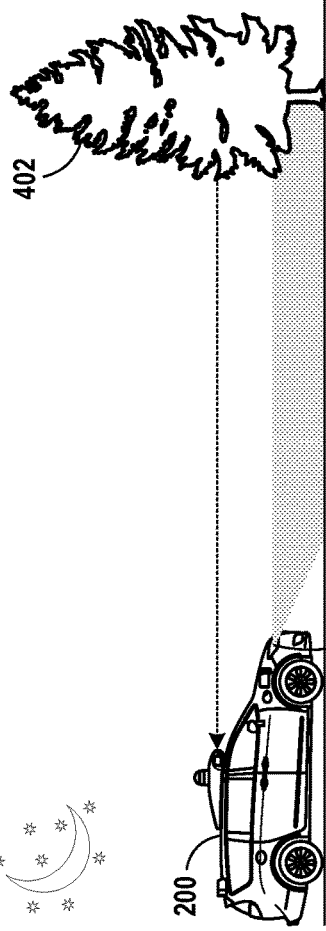
FIG. 7B is an illustration of a low-light condition, according to example embodiments.
Figure 7C:
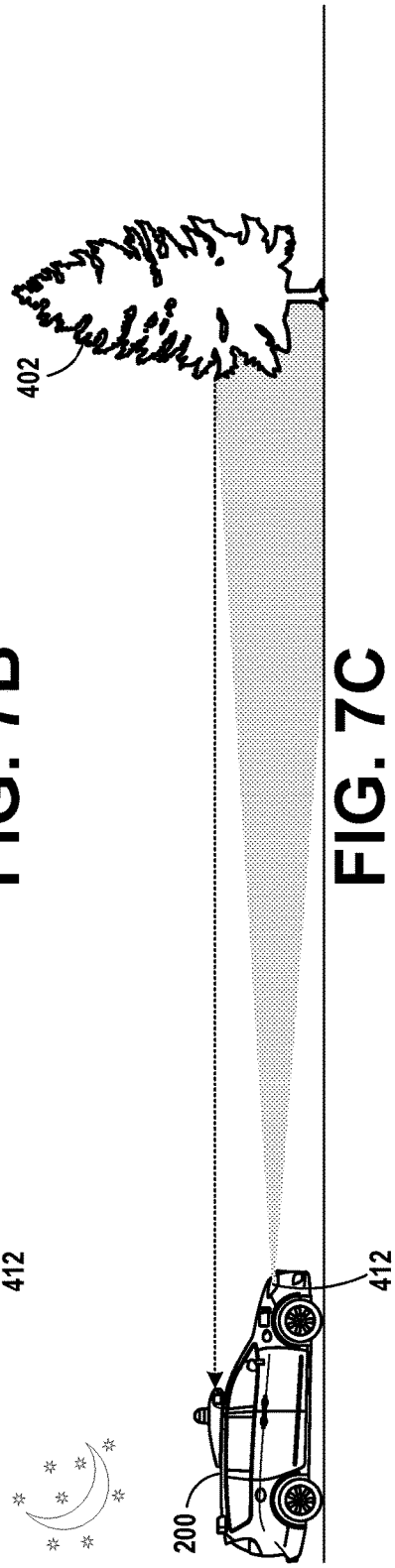
FIG. 7C is an illustration of an intermediate-light condition, according to example embodiments.

FIGS. 7A-7C illustrate systems that include the vehicle 200 and the target object 402. FIG. 7A illustrates a high-light condition (e.g., a daytime ambient lighting condition), FIG. 7B illustrates a low-light condition (e.g., a nighttime ambient lighting condition with a vehicular headlamp 412 of the vehicle 200 operating in a low-beam mode), and FIG. 7C illustrates an intermediate-light condition (e.g., a nighttime ambient lighting condition with a vehicular headlamp 412 of the vehicle 200 operating in a high-beam mode). In some embodiments, the detection device 500 may operate according to a scheme that has three operational modes when encountering the systems of FIG. 7A-7C.

As illustrated in FIG. 7A, at a high-light condition (e.g., during the daytime), the maximum distance at which the target object 402 may be observed (e.g., by the detection device 500) may be a relatively large distance (e.g., about 400 m). Further, as illustrated in FIG. 7B, at a low-light condition (e.g., during the nighttime when the vehicle headlamp 412 of the vehicle 200 is operating in a low-beam mode), the maximum distance at which the target object 402 may be observed (e.g., by the detection device 500) may be a relatively small distance (e.g., about 100 m). Additionally, as illustrated in FIG. 7C, at an intermediate-light condition (e.g., during the nighttime when the vehicle headlamp 412 of the vehicle 200 is operating in a high-beam mode), the maximum distance at which the target object 402 may be observed (e.g., by the detection device 500) may be between the maximum distance at the high-light condition and the maximum distance at the low-light condition. For example, the maximum distance at which the target object 402 may be observed in the intermediate-light condition may be about 250 m. The maximum distance at which the target object 402 is observable at the low-light condition may be determined based on the radiant intensity (i.e., brightness) of the vehicular headlamp 412 operating in the low-beam mode. Similarly, the maximum distance at which the target object 402 is observable at the intermediate-light condition may be determined based on the radiant intensity (i.e., brightness) of the vehicular headlamp 412 operating in the high-beam mode. The example distances given throughout this disclosure are purely examples. It is understood that other maximum observable distances for the low-light condition, the high-light condition, and/or the intermediate-light condition are also possible and are contemplated herein.

When in the high-light condition of FIG. 7A, a detection device 500 of the vehicle 200 may operate using a series of high-light condition settings. For example, the controller 112 of the detection device 500 may cause the readout circuit 602 to perform a relatively low level of pixel binning (e.g., no pixel binning) and may cause the variable aperture 506 to adjust to a relatively small aperture size (e.g., f/4.0). Similarly, when in the low-light condition of FIG. 7B, a detection device 500 of the vehicle 200 may operate using a series of low-light condition settings. For example, the controller 112 of the detection device 500 may cause the readout circuit 602 to perform a relatively high level of pixel binning (e.g., four, nine, or sixteen light-sensitive pixels per effective pixel) and may cause the variable aperture 506 to adjust to a relatively large aperture size (e.g., f/1.6). Likewise, when in the intermediate-light condition of FIG. 7C, a detection device 500 of the vehicle 200 may operate using a series of intermediate-light condition settings. For example, the controller 112 of the detection device 500 may cause the readout circuit 602 to perform an intermediate level of pixel binning (e.g., two or three light-sensitive pixels per effective pixel) and may cause the variable aperture 506 to adjust to an intermediate aperture size (e.g., f/2.8).

As described throughout, ambient lighting conditions (e.g., low-light conditions, high-light conditions, and/or intermediate-light conditions) may be used by a controller 112 to determine one or more settings (e.g., variable aperture size, level of pixel binning, gain, exposure time, etc.) used by a camera 130 to capture images of a surrounding environment. Additionally or alternatively, other factors may be used by the controller 112 to determine one or more settings for the camera 130 (e.g., variable aperture size, level of pixel binning, gain, exposure time, etc.). For example, the controller 112 may determine an expected amount of motion blur to be captured by the camera based on motion of objects in the scene, motion of the detection device 500/associated vehicle 200, motion blur from a previously captured image, etc. Based on the determined expected amount of motion blur, the controller 112 may cause the variable aperture 506 to adjust aperture size (e.g., to a larger size so that a shorter exposure time could be used while still maintaining a sufficient amount of total exposure) and/or the readout circuit 602 to adjust a pixel binning level (e.g., to a decreased level of pixel binning to enhance resolution). In some embodiments, the controller 112 may determine one or more settings for the camera 130 based on a SNR (e.g., of one or more previously captured images). For example, the controller 112 may analyze an image previously captured by the camera 130 to determine a SNR. Then, based on the determined SNR, the controller 112 may adjust one or more camera settings (e.g., cause the variable aperture 506 to adjust aperture size, cause the readout circuit 602 to adjust pixel binning level, change exposure time for future image captures, change gain level, etc.).

Still further, in some embodiments, the controller 112 may determine one or more settings for the camera 130 based on ambient environmental conditions (e.g., temperature, precipitation, humidity, pressure, etc.). For example, the controller 112 may receive, from a temperature sensor (e.g., a digital thermometer), a signal indicative of ambient temperature (i.e., a temperature of the environment of the detection device 500). Based on the signal, the controller 112 may determine the ambient temperature. Additionally or alternatively, the controller 112 may determine the ambient temperature based on a map (e.g., stored within a memory) that discloses average temperatures for certain times a year and a location of the vehicle 200 on the map. After determining the ambient temperature, the controller 112 may adjust one or more camera settings based on the ambient temperature (e.g., cause the variable aperture 506 to adjust aperture size, cause the readout circuit 602 to adjust a pixel binning level, change exposure time for future image captures, change gain level, etc.).

As described above, the controller 112 may determine one or more settings for the camera 130 and/or adjust one or more settings in the camera 130 (e.g., by causing the variable aperture 506 to adjust aperture size or causing the readout circuit 602 to adjust a pixel binning level) based on the ambient lighting conditions (e.g., a high-light condition, a low-light condition, or an intermediate-light condition). In order to determine the ambient lighting conditions, the controller 112 of the detection device 500 may be associated with a clock (e.g., the controller 112 may include an internal clock or receive a clock signal from another computing device). Based on the time of day according to the internal clock, the controller 112 may identify the ambient lighting condition (e.g., daytime vs. dusk/dawn vs. nighttime). The controller 112 may also use other information (e.g., stored within a memory of the controller 112 or transmitted to the controller 112 from another computing device) in determining the ambient lighting conditions. For example, the controller 112 may also use information about a latitude and/or longitude (e.g., based on GPS coordinates) of the detection device 500 along with a calendar that contains information about sunrise/sunset at various geographical locations to determine the ambient lighting conditions. Additionally or alternatively, the controller 112 may analyze one or more images previously captured by the camera 130 in order to determine ambient lighting conditions. For example, the controller 112 may compare the intensity of the light in one or more regions of a captured image to one or more intensity thresholds to determine the ambient lighting conditions. In other embodiments, the controller 112 may receive an indication of the ambient lighting conditions based on a communication from another computing device (e.g., a server computing device may analyze the location of the vehicle 200/detection device 500, a time of day, etc. to determine the ambient lighting conditions and then transmit the ambient lighting conditions to the controller 112 for use by the controller 112 in making control determinations).

Figure 8:
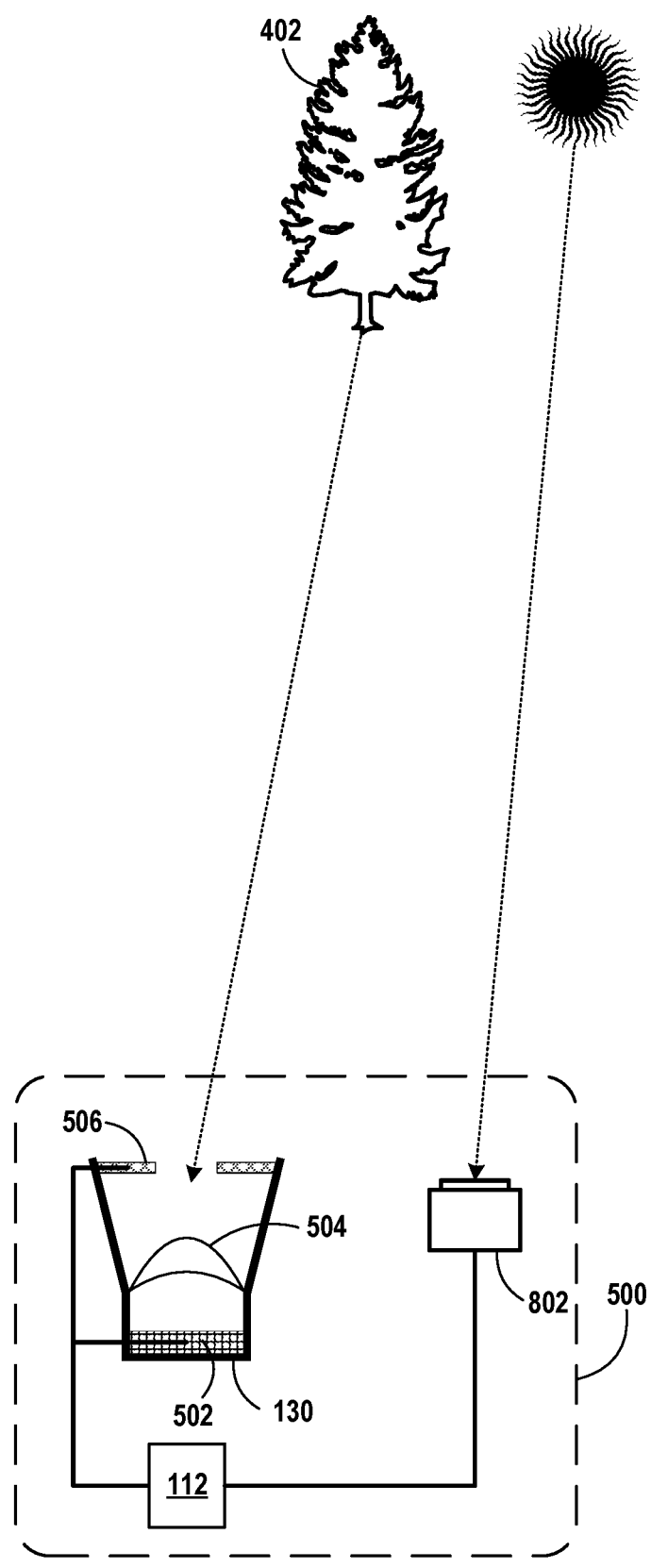
FIG. 8 is an illustration of a device that includes an ambient light sensor, according to example embodiments.

In still other embodiments, the detection device 500 may include an auxiliary ambient light sensor used to determine ambient lighting conditions. Such an example embodiment is illustrated in FIG. 8. As illustrated, the detection device 500 includes an ambient light sensor 802, in addition to the camera 130 and the controller 112. The ambient light sensor 802 may be communicatively coupled to the controller 112 (e.g., so as to provide the controller 112 with a signal indicative of ambient light intensity incident on the ambient light sensor 802). The ambient light sensor 802 may assist the controller 112 in the determination of the ambient lighting conditions in addition to or instead of the controller 112 analyzing previous images captured by the camera 130. The ambient light sensor 802 may include one or more photodetectors, CCDs, SPADs, APDs, SiPMs, etc. in various embodiments. Upon intercepting/detecting light (e.g., ambient light), the ambient light sensor 802 may transmit a signal indicative of an ambient light intensity incident on the ambient light sensor 802 to the controller 112. The controller 112 may then determine the ambient light intensity based on the transmitted signal. Further, the controller 112 may compare the determined ambient light intensity to one or more ambient intensity thresholds to determine an ambient lighting condition (e.g., compare to a low-light threshold and a high-light threshold to determine whether the ambient light condition is a low-light condition, an intermediate-light condition, or a high-light condition). Other techniques for determining the ambient lighting conditions (e.g., besides considering time of day/geographic location, analyzing previous images captured by the camera 130, and using an ambient light sensor 802) are also possible, and are contemplated herein.

Figure 9:
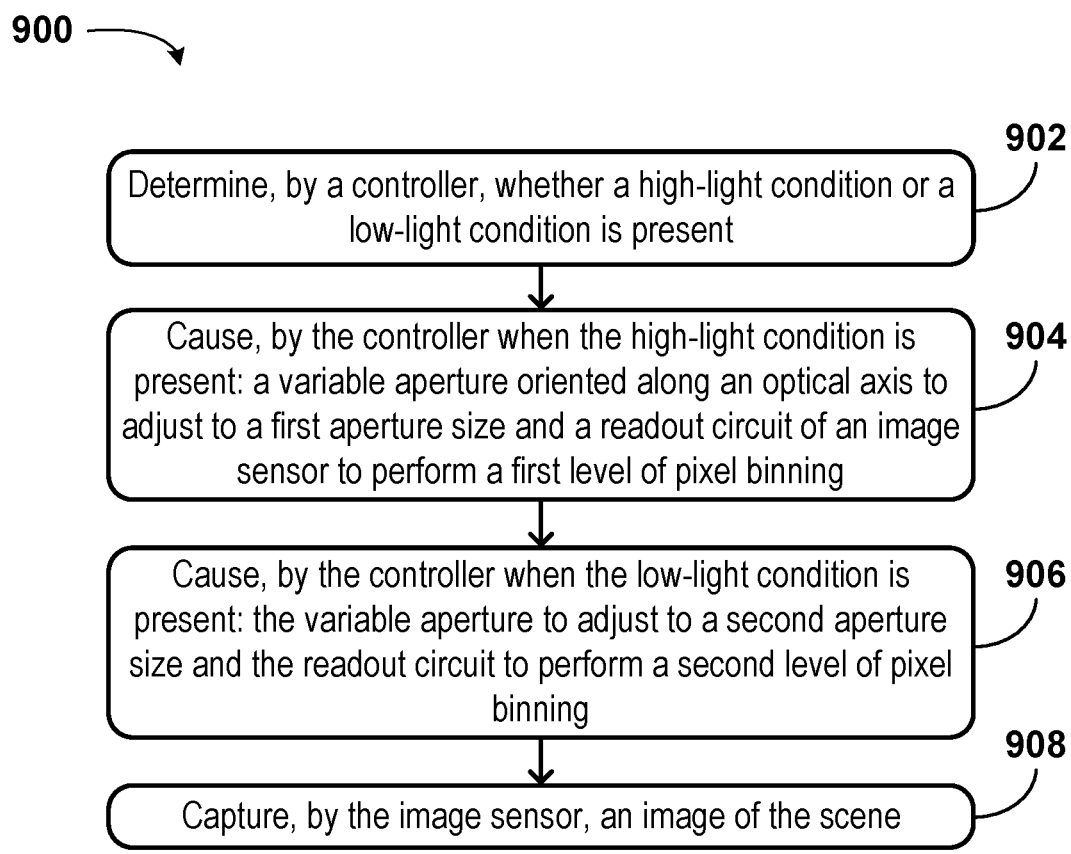
FIG. 9 is an illustration of a method, according to example embodiments.

FIG. 9 is a flowchart diagram of a method 900, according to example embodiments. In some embodiments, the method 900 may be performed by the detection device 500 shown and described with reference to FIG. 5A.

At block 902, the method 900 may include determining, by a controller (e.g., the computer system 112 shown and described with reference to FIGS. 1 and 5A), whether a high-light condition or a low-light condition is present.

At block 904, the method 900 may include causing, by the controller when the high-light condition is present: a variable aperture oriented along an optical axis to adjust to a first aperture size and a readout circuit of an image sensor to perform a first level of pixel binning. The image sensor may include an array of light-sensitive pixels and be configured to capture one or more images of a scene based on light received via a lens oriented along the optical axis. In some embodiments, the image sensor may correspond to the image sensor 502 shown and described with reference to FIGS. 5A, 6A, and 6B. As such, the readout circuit may correspond to the readout circuit 602 shown and described with reference to FIGS. 5A, 6A, and 6B and the array of light-sensitive pixels may correspond to the array 604 of light-sensitive pixels shown and described with reference to FIGS. 5A, 6A, and 6B. Additionally, the variable aperture may correspond to the variable aperture 506 illustrated in FIGS. 5A-5C. Further, the first aperture size may be the aperture size shown and described with reference to FIG. 5B. Similarly, the first level of pixel binning may be the level of pixel binning shown and described with reference to FIG. 6A.

At block 906, the method 900 may include causing, by the controller when the low-light condition is present: the variable aperture to adjust to a second aperture size and the readout circuit to perform a second level of pixel binning. The second aperture size may be larger than the first aperture size. Additionally, the second level of pixel binning may be greater than the first level of pixel binning. Similar to block 904, the second aperture size may be the aperture size shown and described with reference to FIG. 5C. Likewise, the second level of pixel binning may be the level of pixel binning shown and described with reference to FIG. 6B.

At block 908, the method 900 may include capturing, by the image sensor, an image of the scene.

Figure 10:
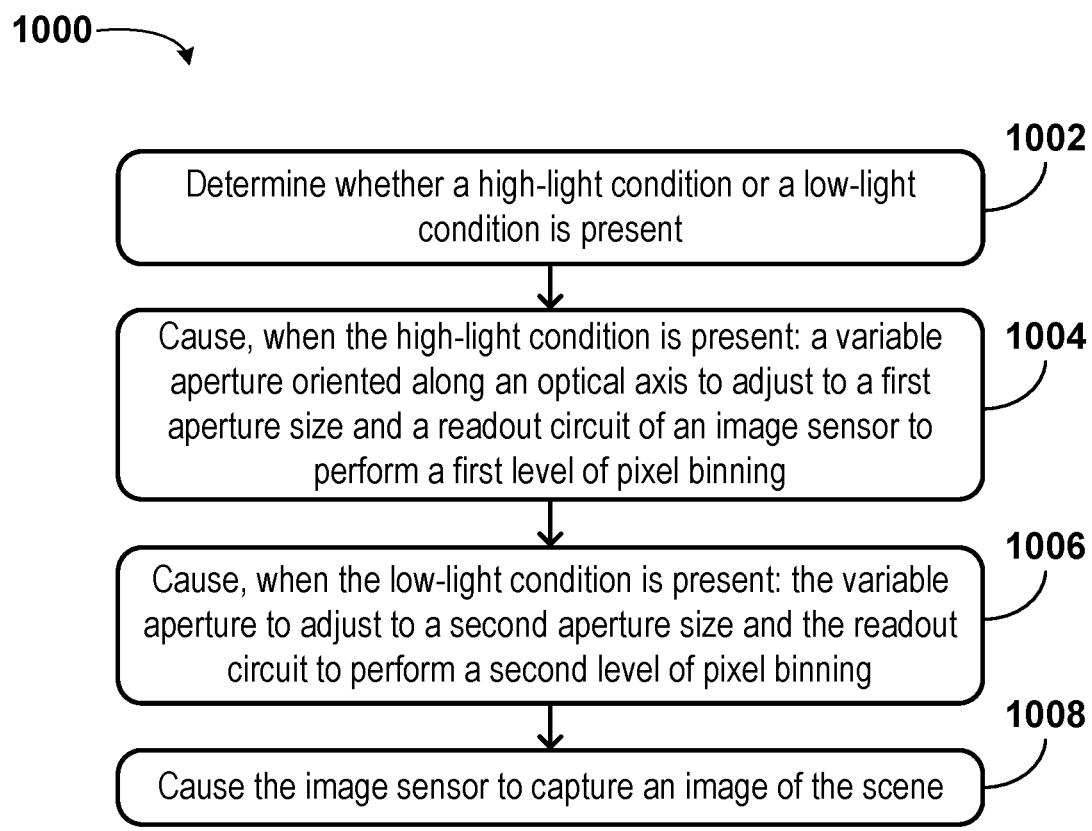
FIG. 10 is an illustration of a method, according to example embodiments.

FIG. 10 is a flowchart diagram of a method 1000, according to example embodiments. In some embodiments, the method 1000 may be performed by the computer system 112 (e.g., the processor 113 executing at least some of the instructions 115 stored in the data storage 114) shown and described with reference to FIG. 1.

At block 1002, the method 1000 may include determining whether a high-light condition or a low-light condition is present. The high-light condition or the low-light condition may be an ambient lighting condition of a surrounding scene, for example.

At block 1004, the method 1000 may include causing, when the high-light condition is present: a variable aperture oriented along an optical axis to adjust to a first aperture size and a readout circuit of an image sensor to perform a first level of pixel binning. In some embodiments, the variable aperture may correspond to the variable aperture 506 shown and described with reference to FIGS. 5A-5C and the first aperture size may correspond to the aperture size illustrated in FIG. 5B. Likewise, the image sensor and the readout circuit may correspond to the image sensor 502 and the readout circuit 602, respectively, shown and described with reference to FIGS. 6A and 6B and the first level of pixel binning may correspond to the pixel binning illustrated in FIG. 6A.

At block 1006, the method 1000 may include causing, when the low-light condition is present: the variable aperture oriented to adjust to a second aperture size and the readout circuit to perform a second level of pixel binning. The second aperture size may be larger than the first aperture size. Further, the second level of pixel binning may be greater than the first level of pixel binning. Like with block 1004, the variable aperture may correspond to the variable aperture 506 shown and described with reference to FIGS. 5A-5C and the second aperture size may correspond to the aperture size illustrated in FIG. 5C. Similarly, the readout circuit may correspond to the readout circuit 602 shown and described with reference to FIGS. 6A and 6B and the second level of pixel binning may correspond to the pixel binning illustrated in FIG. 6B.

At block 1008, the method 1000 may include causing the image sensor to capture an image of the scene.

III. Conclusion

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. In the figures, similar symbols typically identify similar components, unless context dictates otherwise. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the message flow diagrams, scenarios, and flow charts in the figures and as discussed herein, each step, block, operation, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step, block, or operation that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer-readable medium such as a storage device including random-access memory (RAM), a disk drive, a solid state drive, or another storage medium.

Moreover, a step, block, or operation that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A device comprising:
an image sensor comprising an array of light-sensitive pixels and a readout circuit;
a variable aperture; and
a controller configured to:
cause the variable aperture to adjust to a first aperture size when a high-light condition is present;
cause the variable aperture to adjust to a second aperture size when a low-light condition is present;
cause the readout circuit to perform a first level of pixel binning when the high-light condition is present; and
cause the readout circuit to perform a second level of pixel binning when the low-light condition is present.

2. The device of claim 1, wherein a depth of focus corresponding to a combination of the second aperture size and the first level of pixel binning is less than:
a high-light depth of focus corresponding to a high-light combination of the first aperture size and the first level of pixel binning; and a low-light depth of focus corresponding to a low-light combination of the second aperture size and the second level of pixel binning.

3. The device of claim 1, wherein the image sensor is configured to capture one or more images of a scene via a lens, and wherein the lens is a fixed-focus lens.

4. The device of claim 1, wherein the controller is further configured to:
cause the variable aperture to adjust to a third aperture size when an intermediate-light condition is present; and
cause the readout circuit to perform a third level of pixel binning when the intermediate-light condition is present.

5. The device of claim 1, wherein the high-light condition corresponds to a daytime ambient lighting condition, and wherein the low-light condition corresponds to a nighttime ambient lighting condition.

6. The device of claim 5, wherein the controller is further configured to:
determine the first aperture size and the first level of pixel binning based on a desired resolution at a first range; and
determine the second aperture size and the second level of pixel binning based on the desired resolution at a second range.

7. The device of claim 6, wherein the controller is further configured to:
cause the variable aperture to adjust to a third aperture size when an intermediate-light condition is present;
cause the readout circuit to perform a third level of pixel binning when the intermediate-light condition is present; and
determine the third aperture size and the third level of pixel binning based on the desired resolution at a third range.

8. The device of claim 1, wherein the controller is further configured to:
cause the readout circuit to provide a first level of gain when the high-light condition is present; and
cause the readout circuit to perform a second level of gain when the low-light condition is present.

9. The device of claim 1, wherein the variable aperture comprises an iris, an electro-chromic material, or an electro-active polymer.

10. The device of claim 1, wherein the second level of pixel binning corresponds to a two-fold, three-fold, four-fold, nine-fold, or sixteen-fold reduction in a number of effective light-sensitive pixels in the array of light-sensitive pixels when compared to the first level of pixel binning.

11. The device of claim 1, wherein the first aperture size has an f-number between f/1.4 and f/1.8, and wherein the second aperture size has an f-number between f/3.6 and f/4.4.

12. The device of claim 1, wherein the controller is further configured to communicate with an object detection and avoidance system of a vehicle.

13. The device of claim 1, wherein the controller is further configured to determine the presence of the high-light condition or the low-light condition, and wherein determining the presence of the high-light condition or the low-light condition comprises:
receiving, from the image sensor, one or more images, wherein the one or more images are indicative of an ambient light intensity incident on the image sensor; and
determining the ambient light intensity based on the one or more images.

14. The device of claim 1, wherein the controller is further configured to determine the presence of the high-light condition or the low-light condition, and wherein determining the presence of the high-light condition or the low-light condition comprises:
receiving, from an ambient light sensor, a signal indicative of an ambient light intensity incident on the ambient light sensor; and
determining the ambient light intensity based on the signal.

15. The device of claim 1, wherein the controller is further configured to determine the presence of the high-light condition or the low-light condition, and wherein the presence of the high-light condition or the low-light condition is determined based on a time of day according to a clock associated with the controller.

16. The device of claim 1, wherein the controller is further configured to:
determine an expected amount of motion blur to be captured by the image sensor based on motion of objects in a scene, motion of the device, or motion blur present in a previously captured image;
cause the variable aperture to adjust aperture size based on the expected amount of motion blur; and
cause the readout circuit to adjust pixel binning level based on the expected amount of motion blur.

17. The device of claim 1, wherein the controller is further configured to:
receive, from the image sensor, one or more images, wherein the one or more images are indicative of a signal-to-noise ratio;
determine the signal-to-noise ratio based on the one or more images;
cause the variable aperture to adjust aperture size based on the determined signal-to-noise ratio; and
cause the readout circuit to adjust pixel binning level based on the determined signal-to-noise ratio.

18. The device of claim 1, wherein the controller is further configured to:
receive, from a temperature sensor, a signal indicative of an ambient temperature;
determine the ambient temperature based on the signal;
cause the variable aperture to adjust aperture size based on the ambient temperature; and
cause the readout circuit to adjust pixel binning level based on the ambient temperature.

19. A method comprising:
determining, by a controller, whether a high-light condition or a low-light condition is present;
causing, by the controller when the high-light condition is present:
a variable aperture to adjust to a first aperture size; and
a readout circuit of an image sensor to perform a first level of pixel binning,
wherein the image sensor comprises an array of light-sensitive pixels; and
causing, by the controller when the low-light condition is present:
the variable aperture to adjust to a second aperture size; and
the readout circuit to perform a second level of pixel binning.

20. A non-transitory, computer-readable medium having instructions stored therein, wherein the instructions, when executed by a processor, perform a method comprising:

determining whether a high-light condition or a low-light condition is present;
causing, when the high-light condition is present:
   a variable aperture to adjust to a first aperture size; and
   a readout circuit of an image sensor to perform a first level of pixel binning,
wherein the image sensor comprises an array of light-sensitive pixels; and
causing, when the low-light condition is present:
   the variable aperture to adjust to a second aperture size; and
   the readout circuit to perform a second level of pixel binning.

* * * * *